United States Patent [19]
Cook et al.

[11] Patent Number: 6,005,884
[45] Date of Patent: Dec. 21, 1999

[54] DISTRIBUTED ARCHITECTURE FOR A WIRELESS DATA COMMUNICATIONS SYSTEM

[75] Inventors: Joel Powell Cook, Decatur; Randolph Raymond Beebe, Duluth; Thomas Edward Sharon, Alpharetta, all of Ga.

[73] Assignee: EMS Technologies, Inc., Norcross, Ga.

[21] Appl. No.: 08/554,084

[22] Filed: Nov. 6, 1995

[51] Int. Cl.⁶ .............................. H04B 15/00; H04K 1/00; H04L 27/30
[52] U.S. Cl. ...................... 375/202; 455/67.1; 455/524; 455/575; 370/338; 370/401
[58] Field of Search ........................ 340/825.05; 370/279, 370/315, 320; 375/200, 202, 206, 211, 214, 219; 455/7, 13.1, 23, 33.2, 33.3, 524

[56] References Cited

U.S. PATENT DOCUMENTS

| | | |
|---|---|---|
| 4,092,600 | 5/1978 | Zimmerman et al. . |
| 4,123,759 | 10/1978 | Hines et al. . |
| 4,367,458 | 1/1983 | Hackett .................................. 340/539 |
| 4,503,436 | 3/1985 | Cramer, Jr. . |
| 5,130,793 | 7/1992 | Bordry et al. . |
| 5,187,803 | 2/1993 | Sohner et al. . |
| 5,235,632 | 8/1993 | Raith . |
| 5,239,673 | 8/1993 | Natarajan . |
| 5,252,979 | 10/1993 | Nysen . |
| 5,287,384 | 2/1994 | Avery et al. . |
| 5,295,154 | 3/1994 | Meier et al. ........................... 375/200 |
| 5,301,353 | 4/1994 | Borras et al. . |
| 5,349,342 | 9/1994 | Nilles et al. . |
| 5,349,631 | 9/1994 | Lee . |
| 5,373,503 | 12/1994 | Chen ...................................... 370/346 |
| 5,410,737 | 4/1995 | Jones . |
| 5,438,565 | 8/1995 | Hemmady et al. . |
| 5,448,723 | 9/1995 | Rowett ............................... 395/200.02 |
| 5,479,443 | 12/1995 | Kagami et al. ......................... 375/211 |
| 5,509,028 | 4/1996 | Marque-Pucheu ...................... 375/211 |
| 5,657,343 | 8/1997 | Schilling ................................ 375/202 |
| 5,673,031 | 9/1997 | Meier ................................. 340/825.08 |

OTHER PUBLICATIONS

Ghai, Rohit and Singh, Suresh; "An Architecture and Communication Protocol for Picocelluar Networks"; IEEE Personal Communications; Third Quarter, 1994; pp. 36–46.

Chen, Kwang–Cheng; "Medium Access Control of Wireless LANs for Mobile Computing"; IEEE Network; Sep./Oct. 1994; pp. 50–63.

Marketing Publication, LXE, "ExCell"; publication date believed to be prior to Nov. 6, 1995.

Marketing Publication, LXE, "LXE 6410 OmniNet Access Point", Apr. 1995.

Marketing Publication, LXE, "LXE 2320 Scout", Apr. 1995.

Marketing Publication, LXE, "LXE 1330 Explorer", Apr. 1995.

Marketing Publication, LXE, "The Mobile Enterprise", Oct. 1994.

Primary Examiner—Stephen Chin
Assistant Examiner—Joseph Roundtree
Attorney, Agent, or Firm—Jones & Askew, LLP

[57] ABSTRACT

A data communications system characterized by the combination of a base station connected to a plurality of repeaters for communicating with remote terminals in response to outgoing data from a host computer and for communicating with the host computer in response to incoming data from the remote terminals. Each repeater is assigned a coverage area with in a predetermined communications area to support data communications with the remote terminals located within its coverage area. In response to incoming data, a repeater conducts a signal amplification operation and outputs amplified incoming data to the base station via a first communications link. The base station processes the amplified incoming data and, in turn, generates processed incoming data for distribution to the host computer via a second communications link. The base station also processes the outgoing data from the host computer to generate processed outgoing data, and sends transmitted outgoing data to each repeater via the first communications link. Each repeater connected to the base station can amplify the transmitted outgoing data, and outputs amplified outgoing data to the remote terminals within its coverage area.

22 Claims, 13 Drawing Sheets

6,005,884

DISTRIBUTED ARCHITECTURE FOR A WIRELESS DATA COMMUNICATIONS SYSTEM

TECHNICAL FIELD

The present invention is generally directed to a wireless communications system and, more particularly described, is a wireless data communications system having a plurality of repeaters for communicating data between remote terminals and an access point connected to a communications network.

BACKGROUND OF THE INVENTION

Low power wireless data communications systems are typically used in environments for which it is either impractical to install cabling to link a communications network to fixed terminal sites or there exists a need to support communications between the communications network and mobile terminals. Fixed communications environments include railyards and other facilities spread over a large area. For mobile communications environments, a typical application is the use of a wireless data communications system within a warehouse for stocking of goods for shipment or for manufacture.

A typical low power wireless data communications system includes multiple access points for communicating with remote terminals and a host computer. An access point, also described as a base station, generally includes an RF transceiver for communicating with the remote terminals and a network interface for communicating with the host computer. The communications link between the access points and the remote terminals are often implemented by a wireless radio frequency (RF) communications link, whereas the access points are typically connected by coaxial or optical cabling to the host computer. The remote terminals are low power transceivers, typically 100 milliwatts to 1 watt radiated power, having a receiver for receiving data to the access points and a transmitter for transmitting data from the access points. The host computer, which communicates with the access points, is responsible for processing incoming data received by the access points and for generating outgoing data to be transmitted by the access points.

A typical business application for a low power wireless data communications system is the support of communications within a building, such as warehouse, for facilitating the taking of inventory, filling orders, directing employees as to the placement of inbound products in the warehouse, and the like. To supply data for transmission by a remote terminal, each device can include an input device for inputting data and display for displaying data. Input devices include keyboards or keypads, light pens, touch screen displays, and bar code readers and output device include liquid crystal displays, pixel-based output devices, and printers. For mobile communications, the remote terminals can be implemented as a hand-held unit or as a unit mounted on a vehicle, such as a forklift or truck.

Largely by regulatory constraint in the United States of America, wireless data communications system for business applications are typically operated at a low power level because authorized radio transmissions occur within shared portions of the electromagnetic spectrum under the regulatory scheme implemented by the United States Federal Communications Commission (FCC). Since 1985, the FCC has approved the use of low power non-licensed Business Radio Systems regulated under sub part D of Part 15 of Title 47 of the Code of Federal Regulations. Three bands are authorized for such use: 902–928 MHz, 2400–2483.5 MHz, and 5725–5850 MHz. Currently, there are a number of constraints on the operation of such business communications systems, including a maximum radiated power of 1 watt.

Recently, advanced applications of business radio systems have required significantly increased rates of data transmission from mobile remote terminals to access points. While many business radio systems at present operate in the frequency band near approximately 900 MHz, as discussed above, those systems are increasingly unable to support the high data rate capabilities required by new business applications. This limitation on data rate capacity of the 900 MHz systems is a result of the relatively limited frequency bandwidth available in that band. Consequently, many new business radio systems are designed to operate in the frequency band near 2400 MHz to take advantage of the wider frequency bandwidth available in that band. Future systems are expected to migrate to the frequency band near 5800 MHz, as data rate requirements for business communications applications continue to increase.

As newer business radio systems migrate to the higher frequency bands, certain performance limitations become more pronounced. Most particularly, the propagation of RF energy throughout a building or a covered area becomes significantly more directional in nature. In addition, the RF energy within these higher frequency bands is affected more severely by the presence of walls, inventory, ceilings, and other objects and structures within the operating environment. As a result, there may exist certain locations within an application site for which the RF link between an access point and a mobile remote terminal is no longer adequate to effectively maintain the communications link between them. In effect, the RF coverage of a business radio system employing higher frequency access points may be significantly reduced relative to the coverage of a system employing access points at the same physical location and operating at lower frequencies.

In addition to propagation effects, which degrade communications link performance at higher frequencies, higher data rate applications require receivers with wider bandwidths. As receiver bandwidth increases, receiver noise also increases and less link margin is available. Link margin degradation on the order of 30 dB is typical when a data communications system moves from lower to higher frequency bands. This reduced link margin is manifested in a smaller RF coverage area relative to the coverage area that would correspond to a narrow band receiver.

In view of the foregoing, it will be understood that increasing the data rate capacity of a business radio system generally requires an increase in operating frequency to take advantage of the higher bandwidths at these higher frequencies. However, the RF coverage available from a given access point to mobile remote terminals within a site can be reduced significantly by propagation and noise level effects. To compensate for this reduced RF coverage, it is well known to simply increase the number of access points so that RF coverage at all points within the site is adequate to maintain communications links.

Unfortunately, the solution of increasing RF coverage area by increasing the number of access points at a site typically requires the user to incur a significant increase in cost relative to a lower frequency system. This increase in cost arises from two problems. First, the cost of RF components and other devices to operate at higher frequencies with similar power level increases rapidly with increased frequency. As a result, systems with increased numbers of access points have hardware costs significantly greater than the hardware costs for lower frequency systems. In addition, retrofitting existing low frequency sites to operate at higher RF frequencies can entail significant cost when a given set of lower frequency access points must be replaced by an increased number of higher frequency access points. Existing cabling and structure must be removed, while new cabling and structure to accommodate the new access points must be installed at the site.

A need exists for a data communications system which can provide the requisite ubiquitous RF coverage without the expense associated with an increased number of access points. There is a further need for a data communications system that provides an increased data rate associated with operation at a higher RF range, as well as an increased RF coverage area, without the significant cost associated with the addition of more access points to the system. The present invention addresses these needs and other problems of the prior art by the use of a distributed communications architecture employing repeaters to extend the coverage of the data communications system.

SUMMARY OF THE INVENTION

The present invention provides a data communications system useful in a communications environment in which it is impractical to extend cabling from a wired communications network to a fixed remote terminal site. Furthermore, the data communications system of the present invention is useful in a communications environment characterized by mobile remote terminals in communication with a wired communications network. A representative example of a typical application addressed by the present invention includes the communication of inventory control information from remote sites within a warehouse facility to a central processing site. In the past, the requirements for communicating with both fixed and remote terminal sites have been addressed by a wireless data communications system having one or more access points connected to a host computer via a local area network (LAN).

The conventional wireless data communications system is characterized by one or more access points, commonly known as base stations, communicating via a wireless communications link with remote terminals and with a host computer via a LAN. Increasing the coverage area of a conventional system has generally required increasing the number of base stations and network interfaces at great expense to the user. Advantageously, the present invention eliminates the need for adding additional base stations by using repeaters, connected to a single access point, to extend the coverage area of the data communications system. The repeaters, which can be viewed as transmit/receive (T/R) modules, are typically much less expensive than an access point. Consequently, the novel use of repeaters by the present invention reduces the costs associated with retrofitting an existing data communications system or designing a new data communications system to obtain increased coverage.

While addressing the issue of an extended communications coverage area for a data communications system, the present invention also solves the problem presented by a remote terminal receiving a pair of simultaneously transmitted signals having equal or near equal amplitudes and opposites phases within an overlapping area formed by adjacent coverage areas. During the reception process, a pair of simultaneously transmitted signals can combine to create an interference signal having a deep null as a result of the opposite phases of the two signals. In a narrow band, fixed frequency communications system, this "simulcast" problem is generally addressed by physically moving the remote terminal to a new location within the overlap area. However, it is difficult to predict an area of the overlap area that is free from this interference phenomenon because the physical environment of the data communications system shapes the amplitude and phase characteristics of transmitted signals. Indeed, there may exist many areas of the overlap area in which a remote terminal may encounter interference during the reception of a desired signal.

To provide consistent reception of signals within the overlap area of adjacent coverage areas, the present invention can employ spread spectrum communications techniques to distribute signals having frequency diverse components between the base station and the remote terminals. For example, a base station operating in a frequency hopping spread spectrum mode can increase the likelihood that a remote terminal will properly receive the desired information signal within the overlap area because the information signal is transmitted on more than one carrier frequency in a predetermined manner. Even if a pair of simultaneously transmitted signals combine to produce an interference signal at one frequency, the remote terminal is likely to receive the same information at another frequency as the base station hops from one frequency to the next based on the predetermined hop sequence. This spread spectrum communications operation provides a significant advantage over fixed frequency communications operation within the overlapping areas for which simulcast transmissions can occur.

Generally described, the present invention provides a radio frequency (RF) data communications system, operating in a spread spectrum mode, characterized by remote terminals within a predetermined area, repeaters having coverage areas within the predetermined area, and a base station for communication with the remote terminals and a host computer. Incoming data is generated by the remote terminals for transmission to the host computer, whereas outgoing data is generated by the host computer for transmission to the remote terminals. The repeaters communicate with the remote terminals located within their respective coverage area by forwarding the incoming data to the base station. In addition, each repeater communicates with the remote terminals by forwarding the outgoing data supplied from the base station. The base station, which serves as a bridge between the repeaters and the host computer, is connected to each of the repeaters via the first communications link, such as a bidirectional communications cable. The base station is connected to the host computer via a second communications link, such as a wired computer network or an ISDN network. The base station processes incoming data from the remote terminals to generate processed incoming data and processes outgoing data from the host computer to generate processed outgoing data. The base station also operates to forward the processed incoming data to the host computer via the second communications link and to forward the processed outgoing data to the repeaters via the first communications link.

More particularly described, the present invention provides an improvement for an access point of an RF data communications system. The improved access point operates in a spread spectrum mode to communicate with remote terminals within a predetermined area, and operates in a computer communications-compatible mode for communicating with a host computer. The improved access point includes a plurality of repeaters and a base station comprising a transceiver and a communications interface. Each repeater is assigned a coverage area within the predetermined area representing the desired communications environment. Each repeater includes an amplifier module connected between an antenna system and a first communications link extending between the repeater and the base station. The amplifier module amplifies incoming data received via the antenna system from remote terminals within the coverage area of the repeater, and amplifies outgoing data supplied by the base station via the first communications link.

The base station includes a transceiver for radio frequency communications and a communications interface for converting data packets to the desired communications format. A signal processor, typically a signal combiner/splitter, connects each of the first communications links to the base station. The transceiver, which comprises a receiver and a transmitter, receives amplified incoming data from the repeaters via the first communications link and, in response, outputs detected incoming data. The transceiver also sends transmitted outgoing data to each repeater via the first communications link in response to processed outgoing data supplied by the communications interface.

The communications interface, connected to the host computer via a second communications link and to the transceiver, processes detected incoming data supplied by the base station's receiver to generate processed incoming data. Likewise, the communications interface also processes outgoing data supplied by the host computer to generate processed outgoing data. The communications interface forwards the processed incoming data to the host computer via the second communications link, and forwards the processed outgoing data to the transceiver for subsequent transmission to the remote terminals.

Focusing now on another aspect of the present invention, both incoming data packets and outgoing data packets can be converted to intermediate frequency (IF) signals for distribution via the first communications link that connects each repeater to the base station of the data communications system. For coaxial cable installations, the distribution of IF signals generally supports the use of cables having longer lengths because cable losses are reduced at lower frequency ranges. In turn, the use of longer cable lengths supports the implementation of larger coverage areas because the repeaters can be spaced further from the base station.

To distribute IF signals, rather than RF signals, between the repeaters and the base station, each repeater includes: (1) a receive path having a down converter and a receive amplifier and (2) a transmit path having an up-converter and a transmit amplifier. For the receive path, the receive amplifier amplifies the RF signal of incoming data generated by the remote terminals and received via the antenna system. In response to the RF signal of incoming data, the receive amplifier-outputs amplified incoming data. The down-converter, which is connected between the first communications link and the receive amplifier, converts the amplified incoming data to an IF signal of the incoming data. For the transmit path, the up-converter accepts the IF signal of outgoing data, which is generated by the base station and distributed via the first communications link. In response to the IF signal of outgoing data, the up-converter generates an RF signal of outgoing data. The transmit amplifier, which is connected between the up-converter and the antenna system, amplifies the RF signal of the outgoing data to generate amplified outgoing data for transmission via the antenna system to the remote terminals within the coverage area of the repeater.

The base station can include a signal processor, an IF-compatible transceiver comprising a transmitter and a receiver, and a communications interface. The signal processor, which is connected between the transmitter and the receiver and to each first communications link, distributes an IF signal of the outgoing data from the transmitter to each of the repeaters via a corresponding first communications link. The transmitter transmits the IF signal of the outgoing data in response to processed outgoing data supplied by the communications interface. In addition, the signal processor supplies the IF signal of incoming data from each of the repeaters to the receiver. The receiver receives the IF signal of incoming data from the signal processor and, in response, outputs detected incoming data.

The communications interface, which is connected to the host computer via a second communications link and to the transceiver, processes the detected incoming data from the receiver to generate processed incoming data. The communications interface also processes outgoing data from the host computer to generate processed outgoing data for distribution to the transmitter. Processed incoming data is forwarded to the host computer via the second communications link, whereas processed outgoing data is supplied directly to the transmitter.

A typical implementation of the data communications system provided by the present invention uses a bidirectional communications cable, such as coaxial cable or an optical fiber cable, to support the transfer of RF data packets on the first communications link and a LAN for transferring digital network data packets on the second communications link. It will be appreciated that the base station operates as a "bridge" for spanning the different communications protocols associated with RF and digital network data packets. The base station can accept high frequency incoming data (RF or IF) from the remote terminals via the communications path formed by a repeater and the bidirectional communications cable, and converts the high frequency-incoming data to processed incoming data having a signal format compatible with the LAN. The processed incoming data can then be forwarded to the host computer via the LAN. In addition, the base station can accept outgoing data having a digital network format from the host computer, and converts this outgoing data to processed outgoing data having a signal format compatible with high frequency transmission via the bidirectional communications cable.

In view of the foregoing, it will be appreciated that an object of the present invention is to extend the coverage area of a data communications system, characterized by remote terminals and a base station connected to a host computer, without the addition of another base station.

It is another object of the present invention to extend the communications coverage of a data communications system by using repeaters, each having its own coverage area, to extend the coverage areas for communications between remote terminals and a base station.

It is another object of the present invention to support a higher data rate associated with operation of a data communications system at an increased operating frequency range without incurring the expense of adding another base station to the data communications system.

Other objects, advantages, and features will become apparent upon a review of the following detailed description, when taken in conjunction with the drawings and the appended claims.

DETAILED DESCRIPTION OF THE PREFERRED EMBODIMENT

Figure 1:
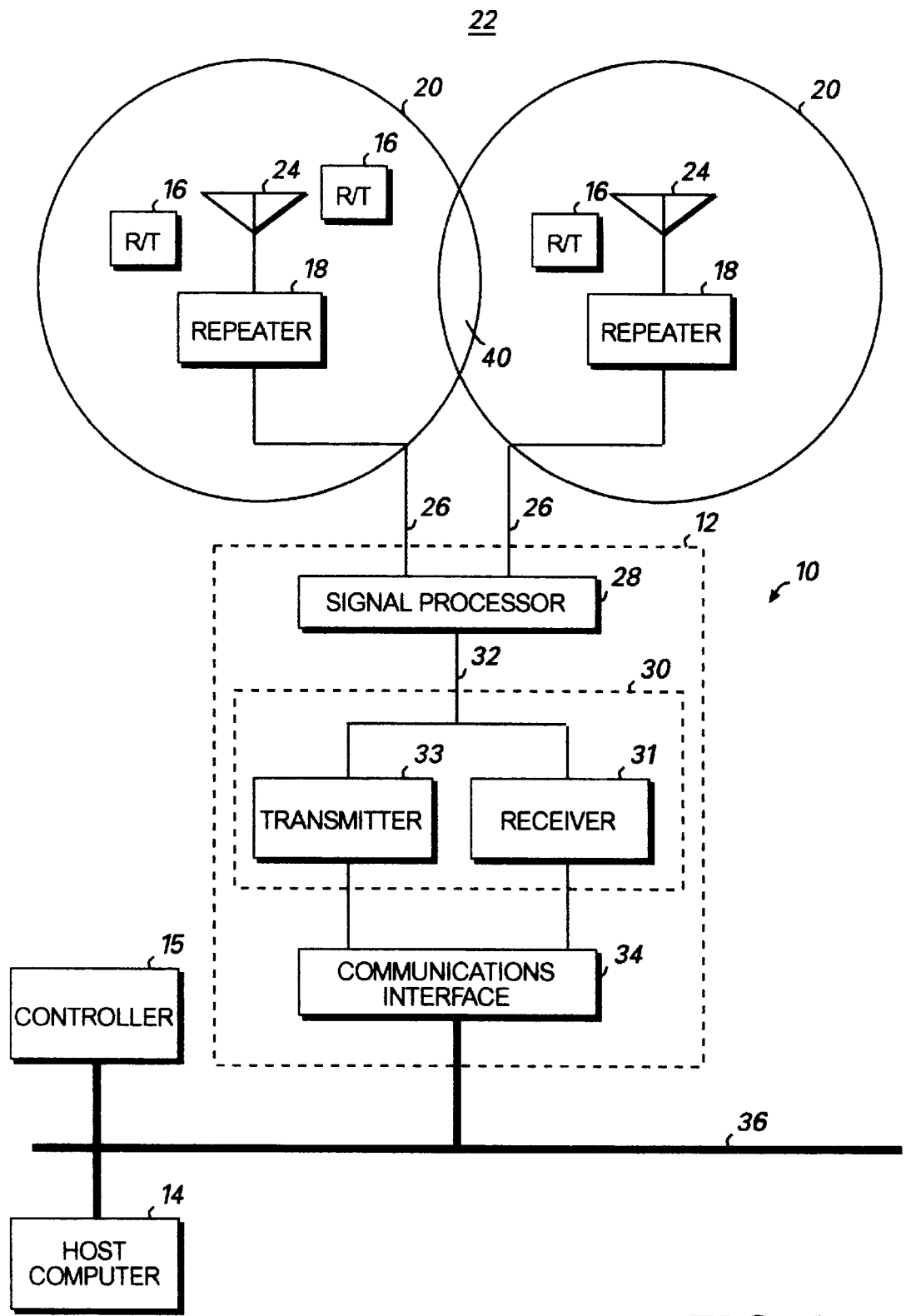
FIG. 1 is a block diagram of an embodiment of the data communications system provided by the present invention.

The present invention provides an economical solution to the problem of extending the coverage area of a data communications system for communicating data packets between remote terminals operating in a radio frequency (RF) environment and a host computer operating in a digital network environment. This extension of the communications coverage area is accomplished by connecting repeaters, also known as transmit/receive (T/R) modules, to a base station or access point for the transmission of incoming data from the remote terminals and outgoing data to the remote terminals. Because the repeaters operate as amplifiers, the overall coverage area of the data communications system can be extended without the installation of another base station. Consequently, the present invention provides an economical solution to the problem of extending the coverage of a data communications system because the acquisition and installation of repeaters is generally less expensive than the addition of another base station.

The present invention provides a data communications system characterized by the combination of a base station, connected to repeaters, for communicating with (1) remote terminals in response to outgoing data from a host computer and (2) the host computer in response to incoming data from the remote terminals. In response to incoming data, a repeater conducts a signal amplification operation and outputs amplified incoming data to the base station via a first communications link. The base station processes the amplified incoming data and, in turn, generates processed incoming data for distribution to the host computer via a second communications link. The base station also processes the outgoing data from the host computer to generate processed outgoing data, and sends transmitted outgoing data to each repeater via the first communications link. Each repeater can amplify the transmitted outgoing data, and outputs amplified outgoing data to the remote terminals within its coverage area.

Prior to a detailed review of the various embodiments of the present invention, it will be useful to review the definitions of several terms used throughout the following specification.

An "access point" facilitates radio coverage for a given area by enabling a wireless network to access a wired network for data communications. The access point, also known as a base station, typically serves as an intermediary between the wireless network and the wired network. In the event that the wired network is a local area network (LAN), an access point serves as a "bridge" spanning the wireless and wired networks, and operates at the Data Link Layer (Layer Two) of the OSI Network Model. Access points can function as a MAC-layer bridge for making binary-level decisions regarding whether to forward packets of information between the wireless and wired networks. Consequently, access points are generally viewed as being network and transport protocol independent.

A "remote terminal" is a radio transceiver characterized by an antenna, a radio receiver for receiving data via the antenna, and a radio transmitter for transmitting data via the antenna. The remote terminal further includes a computer for processing data and one or more input devices, connected to the computer, for supplying data to be transmitted by the transceiver to a central site. Although a remote terminal can be used for either fixed or mobile communications, the typical application for a remote terminal is as a portable data collection device for collecting data from a remote source and communicating the collected data to a central location.

"Spread spectrum" is a radio communications technique used by real-time RF data communications systems, such as Business Radio Systems. In general, a spread spectrum radio signal represents information that is dynamically spread over a relatively wide bandwidth rather than centered within a narrow band of a fixed carrier frequency. Spread spectrum communications require the receiver to have knowledge of the frequency spectrum spreading technique employed by the transmitter to allow the receiver to perform a complementary operation for retrieving information from the received signal.

A "direct sequence spread spectrum (DSSS) communications system" transmits a fixed frequency carrier signal modulated by a modulating signal formed by the combination of a data stream multiplied by a pseudo-random sequence, commonly called a "chip code". Because the pseudo-random bit sequence has statistics that approximate noise, the transmitted signal looks like broadband noise with only a relatively nominal power peak centered at the carrier frequency.

A "frequency hopping spread spectrum (FHSS) communications system" transmits information by "hopping" from one carrier frequency to another carrier frequency. This change in carrier frequencies is defined by a frequency hopping sequence, which describes the set of carrier frequencies, the hop period, and the hop pattern.

Turning now to the drawing figures in which like numerals indicate like elements, the preferred embodiment, as well as alternative embodiments, of the present invention will now be described.

FIG. 1 is block diagram illustrating a data communications system embodying the present invention. In the embodiment shown in FIG. 1, a data communications system 10 includes a base station 12, coupled to a host computer 14 and to a controller 15, for communicating with remote terminals 16 via a set of repeaters 18. Each repeater 18 has a coverage area 20 and the combination of all coverage areas 20 define a predetermined area 22. Adjacent coverage areas 20 preferably overlap so that each portion of the predetermined area will be located within the coverage area of at least one of the repeaters 18. A remote terminal 16 can exchange data packets with host computer 14 via the communications "bridge" supplied by the base station 12 when the remote terminal is located within one of the coverage areas associated with the repeaters 18.

To send a data packet to the base station 12, a remote terminal 16 within the predetermined area 22 transmits a radio signal containing incoming data. Each repeater 18 includes an antenna 24 for transmitting and receiving radio signals within its coverage area 20. Consequently, the radio signal emitted by the remote terminal 16 is received by a repeater 18 having the coverage area 20 in which the signal source is located. In response, the repeater 18 "repeats" the radio signal supplied via the antenna 24 by amplifying the incoming data to generate amplified incoming data. The repeater 18 then outputs the amplified incoming data via a first communications link 26 connected between the repeater 18 and the base station 12. Each of the repeaters 18 is connected to the base station by a bidirectional communications path supplied by the communications link 26.

The base station 12, which is connected to each first communications link 26 and to a second communications link 36, includes a signal processor 28, a transceiver 30, and a communications interface 34. The transceiver 30, which comprises a radio receiver 31 and a radio transmitter 33, is connected to the signal processor 28 via a signal path 32. The communications interface 34, which is connected between the transceiver 30 and the second communications link 36, is primarily responsible for handling the different signal protocols or formats associated with transferring signals from one communications media to another. The second communications link 36, which is preferably implemented by a computer network, supports a bidirectional exchange of data packets among the base station 12, the host computer 14, and the controller 15.

The signal processor 28, which is coupled between each first communications link 26 and the signal path 32, accepts a signal representing the amplified incoming data output by the repeater 18. In similar fashion, the signal processor 28 can accept signals from the remaining repeaters of the data communications system 10 because the signal processor 28 is connected by a first communications link 26 to each of these repeaters. The combination of coverage areas 20 define the predetermined area 22. As shown in FIG. 1, the base station 12 is typically located outside of the predetermined area 22. Consequently, the components of the base station 12, including the signal processor 28, the receiver 31, the transmitter 33, and the communications interface 34 are also positioned outside of the predetermined area 22 formed by the coverage areas 20. The signal processor 28 passes the amplified incoming data to the transceiver 30 via the signal path 32 for detection by the receiver 31.

The signal processor 28 can operate as a signal combiner by combining all signals output from the communications links 26 to generate a summed signal for distribution via the signal path 32. In addition, the signal processor 28 can operate as a signal divider by accepting a signal from the transceiver 30 and dividing this signal for distribution to each of the first communication links 26. Consequently, it will be appreciated that the signal processor 28 performs the functions commonly associated with a conventional RF component, a signal combiner/divider.

The transceiver 30 accepts the amplified incoming data from the signal processor 28 and, in response, the receiver 31 generates a detected signal representing detected incoming data. The communications interface 34 responds to the detected incoming data by producing processed incoming data. The communication interface 34 preferably converts the detected incoming data to a signal protocol or format that is appropriate for communicating this signal to the host computer 14 via the second communications link 36. This conversion operation is useful for converting the signal format of the incoming data passed by the communications link 26, typically a radio signal, to another signal format associated with the communications link 36. Upon completion of the conversion operations, the communications interface outputs the processed incoming data to the host computer 14 via the communications link 36. In this manner, one of the remote terminals 16 can send incoming data to the host computer 14 by routing the data via a repeater 18, the base station 12, and the communication links 26 and 36.

The communications interface 34 also accepts outgoing data, which is generated by the host computer 14 and distributed to the base station 12 via the second communications link 36. Similar to the conversion operation conducted for incoming data, the communications interface 34 processes the outgoing data to generate processed outgoing data. In particular, the communications interface 34 converts the outgoing data from a signal having a format associated with the second communications link 36 to a signal with a format associated with the first communications link 26. The communications interface 34 outputs the processed outgoing data to the transmitter 33 which, in turn, sends transmitted outgoing data to the signal processor 28 via the signal path 32. The signal processor 28 routes the transmitted outgoing data to each of the communications links 26 for delivery to the repeaters 18. In response, each repeater 18 "repeats" the transmitted outgoing data by generating an amplified signal representing amplified outgoing data. In this manner, the amplified outgoing data is transmitted to each of the repeater terminals 16 within the coverage areas 20 of the repeaters 18.

The host computer 14 serves as a central site for receiving and processing incoming data and for generating outgoing data intended for subsequent transmission to the remote terminals 16. The remote terminals 16 are the primary source of incoming data, whereas the host computer 14 is the primary source of outgoing data. Incoming data typically represents data collected by the remote terminals 16 or status information regarding the operation of these devices. In contrast, outgoing data generally represents commands for controlling the operation of the remote terminals 16.

The controller 15, connected to the communications link 36, serves as a network "traffic cop" and is generally responsible for directing the distribution of data packets over the communications link 36. The controller 15 generally directs the flow of incoming data to the host computer 14 and outgoing data from the host computer 14. For example, the controller 15 can forward data packets from the base station 12, as well as from other devices on the communications link 36, to the host computer 14. Furthermore, the controller 15 can accept data packets from another device on the communications link 36, such a terminal, and forward this data to the base station 12 for eventual transmission to the remote terminals 16. In the preferred embodiment, the network controller 15 is arranged so that it makes each of the remote terminals 16 appear as if these RF devices were "smart" terminals connected to the host computer 14.

The pair of coverage areas 20 shown in FIG. 1 slightly overlap to create an overlap area 40. It is desirable to create this overlap area to insure that communications between remote terminals 16 and the base station 12 are maintained when mobile terminals move from coverage area to the next.

The data communications system 10 is preferably implemented as a spread spectrum communications system for servicing a Business Radio System application. Although the present invention can support a variety of spread spectrum techniques, the preferred technique is a frequency hopping spread spectrum (FHSS) operation that increases the reliability of communications by decreasing the amount of interference to and from various users of the RF spectrum. Contrary to the direct sequence spread spectrum (DSSS) technique, the FHSS technique "hops" from carrier frequency to carrier frequency at a specified interval. The transceiver 30 can be assigned a particular frequency hopping sequence that defines a set of discrete "hop" frequencies or channels, a time period between frequency hops, and a predetermined frequency hop sequence. The remote terminals 18 are synchronized with the frequency hopping sequence assigned to the transceiver 30 to permit data communications between the base station 12 and the remote terminals 16 within the predetermined area 22. Consequently, it will be appreciated that each of the coverage areas serviced by a particular base station will be associated with the same frequency hopping sequence.

It will be understood that the present invention can encompass the use of more than one base station 12, each having a corresponding set of repeaters 18, to construct a data communications system. In the event that a remote terminal 16 enters a predetermined area 22 associated with another base station 12, this remote terminal can sync-up with the required frequency hopping sequence by (1) entering a hunt mode and (2) waiting on a frequency of a particular channel-until it receives a synchronization signal associated with that base station 12. This synchronization operation is described in U.S. Pat. No. 5,287,384 entitled "Frequency Hopping Spread Spectrum Data Communication System", issued Feb. 15, 1994. U.S. Pat. No. 5,287,384 is hereby incorporated by reference. As described in detail by the '384 patent, this "park and wait" synchronization process requires the remote terminal to tune to one of several predetermined "home" channels and wait on the selected home channel until the base station transmits on this selected home channel in response to its predetermined frequency hopping sequence. The base station transmits on the home channel a data sequence that supplies required synchronization information, such as the frequency hopping pattern and timing marks. In response to this synchronization information, the remote terminal can adapt its transmit and receive operations to maintain synchronized operations with the base station.

Alternatively, when the remote terminal enters a predetermined area for another base station, the remote terminal can scan all possible channels to look for a master radio signal with a known channel identification message containing the frequency hopping pattern and timing marks for the base station. In response to the detecting the master radio signal, the remote terminal obtains the required synchronization information. It will be appreciated that this synchronization operation requires the base station to repeat the channel identification message for sufficient time intervals to allow a remote terminal to scan all possible channels to acquire the master radio signal.

As noted hereinabove, each of the base stations 12 preferably implement a spread spectrum arrangement complying with Part 15 of the Rules of the Federal Communication Commissions of the United States of America. Part 15 of these regulations, as they exist as of the filing date of this application, are hereby incorporated by reference. The preferred base station 12 complies with the regulatory limitations for an intentionally radiating Business Radio System that is a low power communications device under Sub-part D of Part 15 of the FCC Regulations. Nevertheless, those skilled in the art will appreciate that the present invention is not limited to Business Radio System applications, but can be extended to other communications applications in different frequency ranges.

For a data communications system servicing a Business Radio System application and operating within the 2.4 GHz band, specifically 2.4–2.4835 GHz, regulatory limitations define the minimum number of discrete frequencies or channels, the maximum dwell time per channel, the maximum channel spacing, and the maximum 6 dB bandwidth. First, the minimum discrete channels or frequencies must be at least seventy-five hopping frequencies. The maximum dwell time per channel is 400 milliseconds for any 30 second period. The maximum twenty dB bandwidth of the hopping channel is one MHz. The maximum peak output power of the transmitter should not exceed one Watt. The minimum channel spacing must be the larger of either 25 kHz or the dB bandwidth of the hopping channel. Each hopping frequency must be used equally on the average by each transmitter. Similar FCC regulatory requirements exist for the other Business Radio System bands, including the 900 MHz and 5.8 GHz bands.

For the preferred data communications system 10, the first communications link 26 is implemented by a bidirectional transmission device, such as a coaxial cable, and the second communications link 36 is implemented by a wired computer network, such as a LAN. The communications link 26 can transport radio signals, such as RF signals or intermediate frequency (IF) signals, between the repeaters 18 and the base station 12. In addition, the communications link 26 can carry high-speed digital signals between the repeaters 18 and the base station 12. In contrast, the communications link 36 preferably operates within a client/server computing environment. Consequently, the base station 12 provides a bridge spanning a RF communications path and a wired network. This RF communications path includes the wireless link between a remote terminal 16 and a repeater 18, and the wired link between the repeater 18 and the base station 12. The base station 12 preferably reformats the RF Data Link layer protocol of the incoming data into an IEEE 802.3 ETHERNET standard protocol to support the forwarding of the data packet via the LAN. A similar operation is performed by the base station 12 to support the forwarding of outgoing data from the LAN to the bidirectional transmission device. However, it will be appreciated that the base station 12 is protocol independent because this device functions independently of the network layer (OSI layer 3), the transport layer (OSI layer 4), and other protocols operating above these OSI model layers.

Although the host computer 14 preferably communicates with the base station 12 by use of the IEEE 802.3 ETHERNET standard protocol, it will be appreciated that other conventional protocols can be employed in systems embodying the present invention. Implementation of the ETHERNET protocol and associated network hardware is well known. Moreover, the communications link 36 can be implemented by other local area or wide area network architectures for supporting the data communications system embodying the present invention.

The controller 15 typically operates as a server within a client/server environment to service the communications needs of the host computer 14 and for providing services to the various terminals connected to the wired computer network. For a typical LAN application, the controller 15 operates to route data packets from the host computer 14 to the base station 12 or to the terminals connected to the LAN. The controller 15 also can route data packets from the base station 12 to the host computer 14 or to terminals on the LAN. For data communications system employing more than one base station 12, the controller 15 is responsible for routing data packets to and from the appropriate base station. In this manner, the host computer 14 can view the remote terminals 16 as if they were terminals directly connected to either the computer or to a standard terminal controller device. It will be appreciated that the functions of the controller 15 can be incorporated within the structure of the base station 12 or the host computer 14. The remote terminals 16 are preferably implemented by the combination of a radio transceiver and a microprocessor-based personal computer. The radio transceiver of the remote terminal 16 supports communications with the base station 12. The computer can control the operation of the remote terminal 16 and support the collection and storage of data from a remote site. For compatibility with the base station 12, the radio transceiver of the remote terminal 16 is a spread spectrum communications device, preferably using the FHSS technique. The remote terminal 16 further includes an antenna, such as an omni-directional antenna, connected to the radio transceiver to support data communications.

To facilitate the collection of data, the computer of the remote terminal 16 can be connected to a variety of input devices. These input devices include keyboards or keypads, bar code scanners, and display screen touch-sensitive buttons. It will be understood that the input device connected to the computer of the remote terminal 16 is defined by the particular data collection application. For example, inventory applications within a warehouse typically use a bar code scanner or on-screen touch-sensitive buttons. To support user operation of the remote terminal 16, as well as to display collected data, the remote terminal 16 also can include an output device, such as a liquid crystal display (LCD) monochrome display or a color display device. The output device is useful for displaying outgoing data received by the remote terminal 16 and results of local operation of the input device.

The remote terminal 16 can be implemented as a fixed communication devices or as a roaming or mobile communication device. If mobile, the remote terminals 16 can freely roam about the physical locations of the data communications system 10 by moving from one coverage area of a repeater 18 to another repeater's coverage area. Consequently, communications between the remote terminal 16 and the base station 12 can occur so long as the remote terminals 16 remain within the predetermined area of the data communications system 10.

The remote terminals 16 can be implemented by the Model 1330 Explorer or the Model 2320 Scout, both available from LXE, Inc. of Norcross, Ga. The Model 1330 Explorer includes a model 486-compatible microprocessor, up to 4 megabytes of random access memory (RAM), a monochrome LCD display, and a communication port for connecting an input device, such a powered bar code scanner. A keyboard can be connected to the Model 1330 Explorer for controlling the terminal and for inputting data. In addition, the Model 1330 Explorer can employ the FHSS technique in either the 900 MHz or the 2.4 GHz bands. The data rate for the 2.4 GHz band is 1.6 Mbps, whereas the data rate for the 900 MHz band is 64 Kbps.

The combination of the transceiver 30 and the communications interface 34 in the base station 12 can be implemented by a Model 6410 OmniNet Access Point available from LXE, Inc. The Model 6410 includes an ETHERNET interface for supporting an industry standard computer network and is compatible with the IEEE 802.3 ETHERNET standard. The Model 6410 includes a transceiver capable of operation within the frequency band of 2.4–2.4835 GHz and employs a frequency hopping spread spectrum communications technique.

In view of the foregoing, it will be appreciated that the repeaters 18 operate to reproduce the data signals transmitted by the base station 12 and the remote terminals 16. The simple addition of another repeater to the data communications system 10 supports the extension of the overall coverage area of the system. In the past, data communications systems were limited to the coverage area associated with a single base station. In other words, to obtain additional coverage, it was necessary to add another base station to an existing system or to a new design. Advantageously, the solution presented by the present invention for extending communications coverage is cost effective because the addition of a repeater is less costly than the addition of another base station. Moreover, the use of repeaters with a single base station to extend the overall coverage area of the data communications system can be accomplished without requiring mobile remote terminals to exchange "roaming" control information with the base station. For example, the exchange of roaming control information is not required for the architecture of a single base station and multiple repeaters/coverage areas because all coverage areas have the same predetermined frequency hopping sequence.

Figure 2:
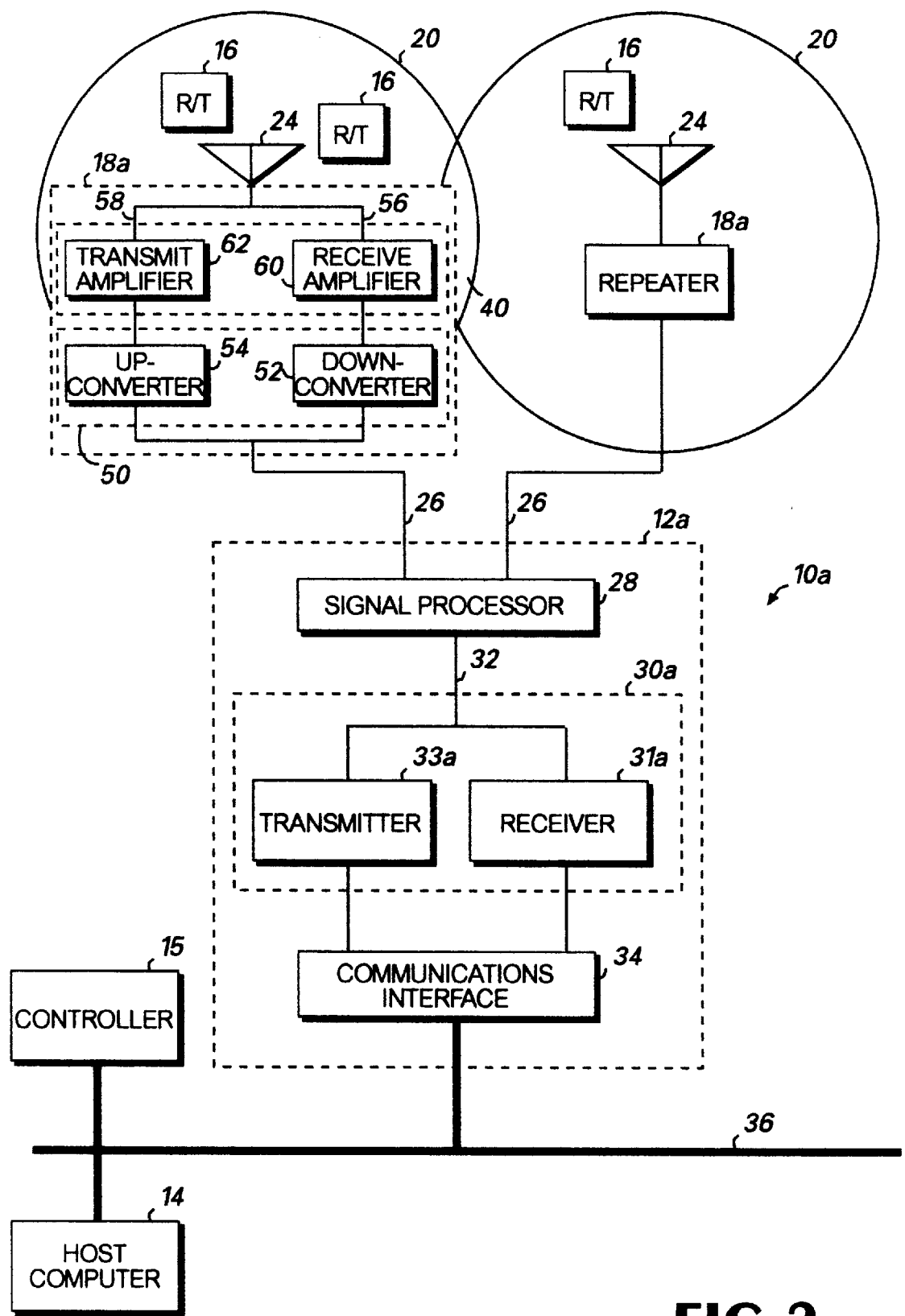
FIG. 2 is a block diagram illustrating an alternative embodiment of the data communications system provided by the present invention.

Turning now to FIG. 2, which illustrates the preferred embodiment of the present invention, a data communications system 10a includes a set of repeaters 18a, each including a converter 50 for converting the frequency range of the outgoing data signals and the incoming data signals. Each converter 50 includes a down-converter 52 and an up-converter 54. The down-converter 52 conducts a frequency down-conversion operation to shift the frequency of an incoming data signal from the RF range to an IF range. In similar fashion, the up-converter 54 conducts a frequency up-conversion operation by shifting the IF range of an outgoing data signal to an RF range. The down-converter 52 and the up-converter 54 can be implemented by the conventional combination of a mixer connected to a local oscillator.

It will be understood that the remote terminals 16 typically transmit and receive signals within the RF range of the frequency spectrum, such as the frequency bands allocated for Business Radio System applications. Consequently, the repeaters 18a can accept the RF signals from the remote terminals 16 and pass RF signals to the remote terminals 16. However, the down-converter 52 supports the distribution of IF signals from a repeater 18a to a base station 12a and to the repeater 18a from the base station 12a. Accordingly, the communications link 26 carries an IF signal rather than an RF signal during the transfer of data between a repeater 18a and the base station 12a. This provides the advantage of reducing signal losses resulting from distribution of data via a physical media, such as a coaxial cable or a twisted-pair cable, because cable losses are generally reduced as the frequency range decreases. This reduction of cable losses by the distribution of IF signals rather than RF signals is significant because signal gain can be achieved at both ends of the communications link 26, i.e., the base station 12a and the repeater 18a. An advantage is gained by the half-duplex operation of the data communications system 10a because the signal path for forwarding outgoing data from the base station 12a to the repeater 18a is identical to the signal path for forwarding incoming data from the repeater 18a to the base station 12a.

The repeater 18a includes a receive path 56 and a transmit path 58, each path connected between the antenna 24 and the communications link 26. The receive path includes the down-converter 52 and a receive amplifier 60, whereas the transmit path 58 includes the up-converter 54 and a transmit amplifier 62. The receiver amplifier 60 amplifies incoming data supplied from the remote terminals 16 via the antenna 24 and outputs amplified incoming data. The amplified incoming data represents an amplified version of the incoming data transmitted by a remote terminal 16. Consequently, the receive amplifier 60 outputs an RF signal to the down-converter 52 which, in turn, conducts a down-conversion operation to generate an IF signal representing the amplified incoming data. From the communications link 26, the up-converter 54 receives an IF signal representing transmitted outgoing data, and conducts an up-conversion operation to generate an RF signal. In turn, the transmit amplifier 62 amplifies the RF signal representing transmitted outgoing data and outputs amplified outgoing data.

To support the distribution of IF signals between the base station 12a and the repeaters 18a, the base station 12a can include a transceiver 30a capable of transmitting and receiving IF signals onto the first communications link 26. The transceiver 30a accepts an IF signal of incoming data from a signal processor 28 and, in response, generates detected incoming data. The transceiver 30a also transmits an IF signal of outgoing data in response to processed outgoing data supplied by the communications interface 34. It will be understood that the transceiver 30a performs functions similar to those of the transceiver 30 described with respect to FIG. 1, with the exception that the transceiver 30a conducts transmit and receive operations upon IF signals rather than RF signals.

In view of the foregoing, the operation of the data communications system 10a shown in FIG. 2 will now be described. A remote terminal 16, which is operating in a spread spectrum mode, transmits an RF signal of incoming data within the predetermined area 22. A repeater 18a for the coverage area 20 in which the remote terminal 16 is located receives this RF signal and passes it from the antenna 24 to the receive amplifier 60. In response, the receive amplifier 60 outputs an amplified version of the RF signal of incoming data to the down-converter 52. The down-converter 52 responds by converting the RF signal of the incoming data to an IF signal of incoming data. The down-converter 52 then outputs this IF signal to the base station 12a via the communications link 26. In this manner, an IF signal is carried by the communications link 26 rather than the RF signal previously described with respect to FIG. 1.

The signal processor 28, which is connected to the other end of the communications link 26, receives the IF signal of incoming data at the base stations 12. In response, the signal processor 28 forwards this IF signal to the transceiver 30a via the signal path 32. The transceiver 30a, which includes a radio receiver 31a capable of detecting IF signals, outputs a detected version of the IF signal of incoming data. The receiver 31a supplies the detected incoming data to the communication interface 34. In turn, the communications interface 34 processes the detected incoming data, and thereafter outputs processed incoming data to the host computer 14 via the communications link 36.

Similar to the data communications system of FIG. 1, the communications interface 34 shown in FIG. 2 also accepts outgoing data from the host computer 14 for subsequent transmission to the remote terminals 18. In response, the communications interface 34 converts the outgoing data from a protocol compatible with network transmissions carried by the communications link 36 to a protocol compatible with radio transmissions supported by the communications link 26. In response to processed outgoing data from the communications interface 34, the transmitter 33a of the transceiver 30a outputs an IF signal of outgoing data to the signal processor 28 via the signal path 32. In turn, the signal processor 28 routes the IF signal of outgoing data to the communication links 26 connected to the repeaters 18a.

Each repeater 18a receives the IF signal of outgoing data at the opposite end of the first communications link 26. This IF signal is passed to the up-converter 54 for shifting the carrier frequency range from the IF range to the RF range. Specifically, the up-converter 54 converts the IF signal of outgoing data to an RF version of the outgoing data. The transmit amplifier 62 accepts the RF signal of outgoing data and, in turn, generates an amplified version of this signal. The amplified outgoing data is output by the transmit amplifier 62 to the antenna 24 for distribution to the remote terminals 16 within the predetermined area 22. It will be understood that the up-conversion operation performed by the repeater 18a facilitates the forwarding of the RF signal of outgoing data to repeaters 16 within its coverage area.

The transceiver of the base station 12 (FIG. 1) and the base station 12a (FIG. 2) can be implemented by a frequency synthesizer capable of frequency hopping operations to generate the required frequency carriers and modulation operations for modulating these frequency carriers. To support operation at each of the three unlicensed bands for Business Radio Systems, i.e., 902–928 MHz, 2400–2483.5 MHz, and 5725–5850 MHz, the frequency synthesizer should respectively cover bandwidths of approximately 28 MHz, 83 MHz, and 150 MHz. For the 900 MHz band, each frequency carrier has a bandwidth of 250 kHz; the 2.4 GHz band, each frequency carrier has a bandwidth of 1 MHz; and the 5.8 GHz band, each frequency carrier has a bandwidth of 2 MHz. These carrier bandwidths are defined by the preferred FHSS mode.

Figure 3:
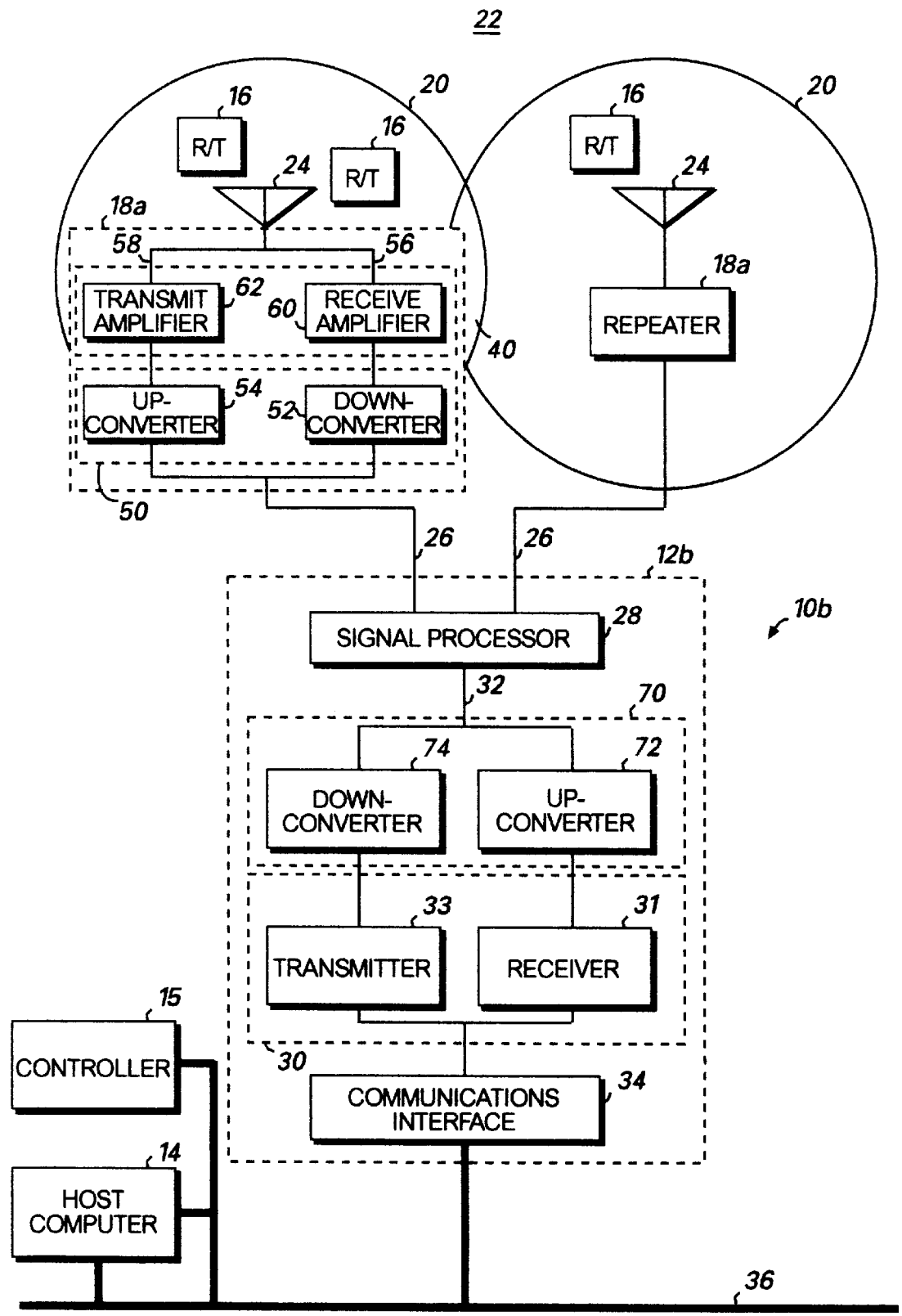
FIG. 3 is a block diagram illustrating an alternative embodiment of the data communications system provided by the present invention.

FIG. 3 is a block diagram illustrating an alternative embodiment for the base station of a data communications system. Unlike the base station 12a of FIG. 2, FIG. 3 shows a base station 12b having a transceiver that transmits and receive RF signals rather than IF signals. Accordingly, to achieve the reduced signal losses offered by passing IF signals via the communications link 26, a conversion system is added between the transceiver 30 and the signal processor 28. Referring to FIGS. 2 and 3, the base station 12b comprises the signal processor 28, the transceiver 30, the communications interface 34, and the converter 70. The converter 70, which is connected between the signal processor 28 and the transceiver 30, includes an up-converter 72 and a down-converter 74 for conducting frequency conversion operations to shift the frequency of signals distributed to and from the transceiver 30. The up-converter 72 converts the RF signal of outgoing data from the transceiver 30 and generates an IF signal of outgoing data for distribution to the signal processor 28. In contrast, the down-converter 74 accepts the IF signal of incoming data from the signal processor 28 and, in response, outputs an RF signal of incoming data to the transceiver 30. Consequently, it will be appreciated that the up-converter 72 conducts up-conversion operations, whereas the down-converter 74 conducts down-conversion operations.

It will be appreciated that conventional base stations typically transmit and receive signals within the RF range rather than the signals within the IF range. Consequently, to retrofit or otherwise adapt conventional base stations to operate within the architecture defined by the present invention, it is typically necessary to supply a frequency conversion module, such as the conversion module 70, between the transceiver 30 and the signal processor 28. The use of the frequency conversion module 70 within the base station 12b allows the transceiver 30 to continue to transmit and receive RF signals, while further supporting the communication of IF signals between the base station 12b and the repeaters 18a.

Figure 4:
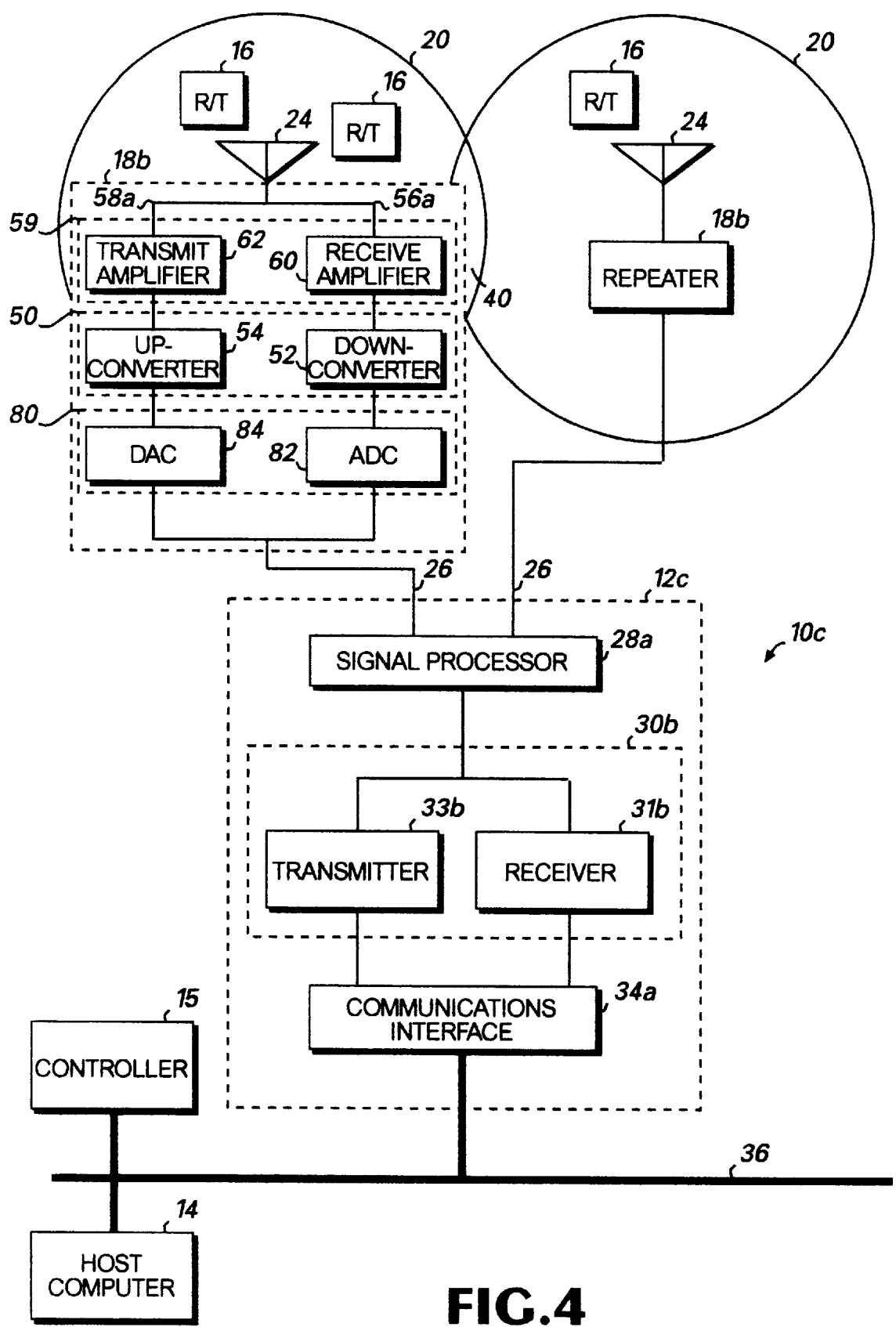
FIG. 4 is a block diagram illustrating an alternative embodiment of the data communications system provided by the present invention.

The data communications system of the present invention also can be adapted to communicate data packets having a digital format rather than the analog format described with respect to FIGS. 1–3. FIG. 4 is a block diagram illustrating a data communications system employing digital communications techniques for transporting data packets on the communications link between the base station and the repeaters. Referring now to FIG. 4, a data communications system 10c features the exchange of digital data packets between a base station 12c and repeaters 18b via the communications link 26. This distribution of digital versions of incoming and outgoing data packets on the communications link 26 requires the inclusion within each repeater 18b of an analog-to-digital converter (ADC) and a digital-to-analog converter (DAC).

Focusing first on the repeater 18b, the frequency converter module 50 is connected between an amplifier module 59 and a signal converter module 80. The amplifier module 59 is connected to the antenna 24, whereas the signal converter 80 is connected to the first communications link 26. The amplifier module 59 comprises the receive amplifier 60 and the transmit amplifier 62, each connected to the antenna 24. The frequency converter module 50 can supply (1) an RF signal to the transmit amplifier 62 in response to an IF signal from the signal converter module 80 and (2) an IF signal to the signal converter 80 in response to an RF signal from the receive amplifier 60. The signal converter 80 includes an ADC 82 and a DAC 84, each connected to the first communications link 26, for conducting signal conversion operations.

The repeater 18b includes both a receive path 56a and a transmit path 58a, each signal path connected between the antenna 24 and the first communications link 26. The receive path 56a includes the down-converter 52, the receive amplifier 60, and the ADC 82, whereas the transmit path 58a includes the up-converter 54, the transmit amplifier 62, and the DAC 84. RF signals transmitted by the remote terminals 16 enter the receive path 56a via the antenna 24, and corresponding digital signals exit the receive path 56a and enter the communications link 26. In contrast, digital signals enter the transmit path 58a from the first communications link 26 and corresponding RF signals exit the transmit path 58a via the antenna system 24.

RF signals are distributed to and from the repeater 18b via the antenna system 24. In contrast, digital signals are distributed to and from the repeater 18b via the first communications link 26. In the transmit path 58a, the DAC 84 accepts digital outgoing data from the base station 12c and, in response, converts the digital outgoing data to an analog signal format, i.e., an IF signal of outgoing data. The DAC 84 outputs the IF signal of the outgoing data to the up-converter 54, which converts the IF signal to an RF signal. In turn, the transmit amplifier 64 outputs an RF signal representing amplified outgoing data. For the receive path 56a, the ADC 82 converts the IF signal of incoming data from the down-converter 52 to a digital signal format, i.e., digital incoming data. The repeater 18b then supplies the digital incoming data to the base station 12c via the first communications link 26.

The base station 12c includes a signal processor 28a, a transceiver 30b, and a communications interface 34a to support the exchange of digital signals with the repeaters 18b and the host computer 14. The signal processor 28a, which is connected to each of the communication links 26, can distribute digital signals in the form of digital data packets to and from the base station 12c. Specifically, the signal processor 28a passes digital incoming data from the first communication link 26 to the transceiver 30b. Likewise, the signal processor 28a forwards digital outgoing data from the transceiver 30b to each of the first communication links 26. The transceiver 30b, which is connected between the signal processor 28a and the communications interface 34a, is preferably implemented by one or more digital signal processing modules to support the transmission and reception of digital data packets. Specifically, a digital receiver 31b and a digital transmitter 33b are preferably implemented by digital signal processing modules to conduct the respective receive and transmit functions of the transceiver 30b. In addition, the communications interface 34a is adapted to accept digital data packets from the receiver 31b and to forward digital data packets to the transmitter 33b.

Turning now to a review of the operation of the data communications system 10c, a remote terminal 16 outputs an RF signal containing incoming data within one of the coverage areas 20 of the predetermined area 22. The repeater 18b located within that coverage area receives the incoming data via its antenna 24. In turn, the incoming data is processed by the components of the receive path 56a to supply a digital version of the incoming data to the first communications link 26. In particular, the receive amplifier 60 accepts the RF signal of incoming data and, in turn, generates an amplified version of the incoming data. In response to the amplified incoming data, the down-converter 52 outputs an IF version of the amplified incoming data by conducting a down-conversion operation. The ADC 82 accepts the IF signal of incoming data and conducts an analog-to-digital conversion operation. This conversion operation produces a digital version of the IF signal of incoming data. Consequently, the ADC 82 outputs the digital incoming data to the base station 12c via the first communications link 26.

At the other end of the first communications link 26, the signal processor 28a accepts the digital incoming data as an input signal. In turn, the signal processor 28a forwards the digital incoming data to the transceiver 30b. The receiver 31b, which accepts the digital incoming data as an input signal, conducts a detection operation resulting in detected incoming data. The receiver 31b outputs the detected incoming data to the communications interface 34a for conversion from the digital data packet format associated with the first communications link 26 to the network protocol associated with the second communications link 36. This processed incoming data is then output by the communications interface 34a to the host computer 14 via the communications link 36.

In response to outgoing data generated by the host computer 14, the communications interface 34a converts the format of the outgoing data from one compatible with the communications link 36 to a format compatible with the communications link 26. This results in processed outgoing data, which is output by the communications interface 34a to the transceiver 30b. In response, the transmitter 33b sends digital outgoing data to the signal processor 28a. In turn, the signal processor 28a forwards the digital outgoing data to the repeaters 18b via the communications links 26. In this manner, digital data packets of outgoing data are transmitted over the communication links 26 to the repeaters 18b.

At a repeater 18b, the DAC 84 receives the digital outgoing data from the first communications link 26. In response, the DAC 84 conducts a digital-to-analog conversion operation, thereby generating an analog version of the digital outgoing data. Consequently, the DAC 84 outputs an IF signal of the outgoing data to the up-converter 54. The up-converter 54 shifts the frequency range of the IF signal to the RF range, thereby generating an RF signal of outgoing data. The transmit amplified 62 accepts the RF signal of outgoing data and, in response, generates amplified outgoing data. The transmitted outgoing data is forwarded to the remote terminals 16 within the coverage area 20 of the repeater 18b via the antenna 24.

The exchange of digital format signals between the base station 12c and the repeaters 18b is useful because this digital signal format facilitates the application of conventional digital processing techniques upon these digital data packets. For example, time delay compensation of each of the communication links 26 can be conveniently accomplished by delaying the appropriate digital incoming and/or outgoing data packets by the appropriate number of clock cycles of the base station 12c. Moreover, digital filtering techniques can be advantageously applied to the digital incoming and outgoing data rather than analog filtering techniques.

Figure 5:
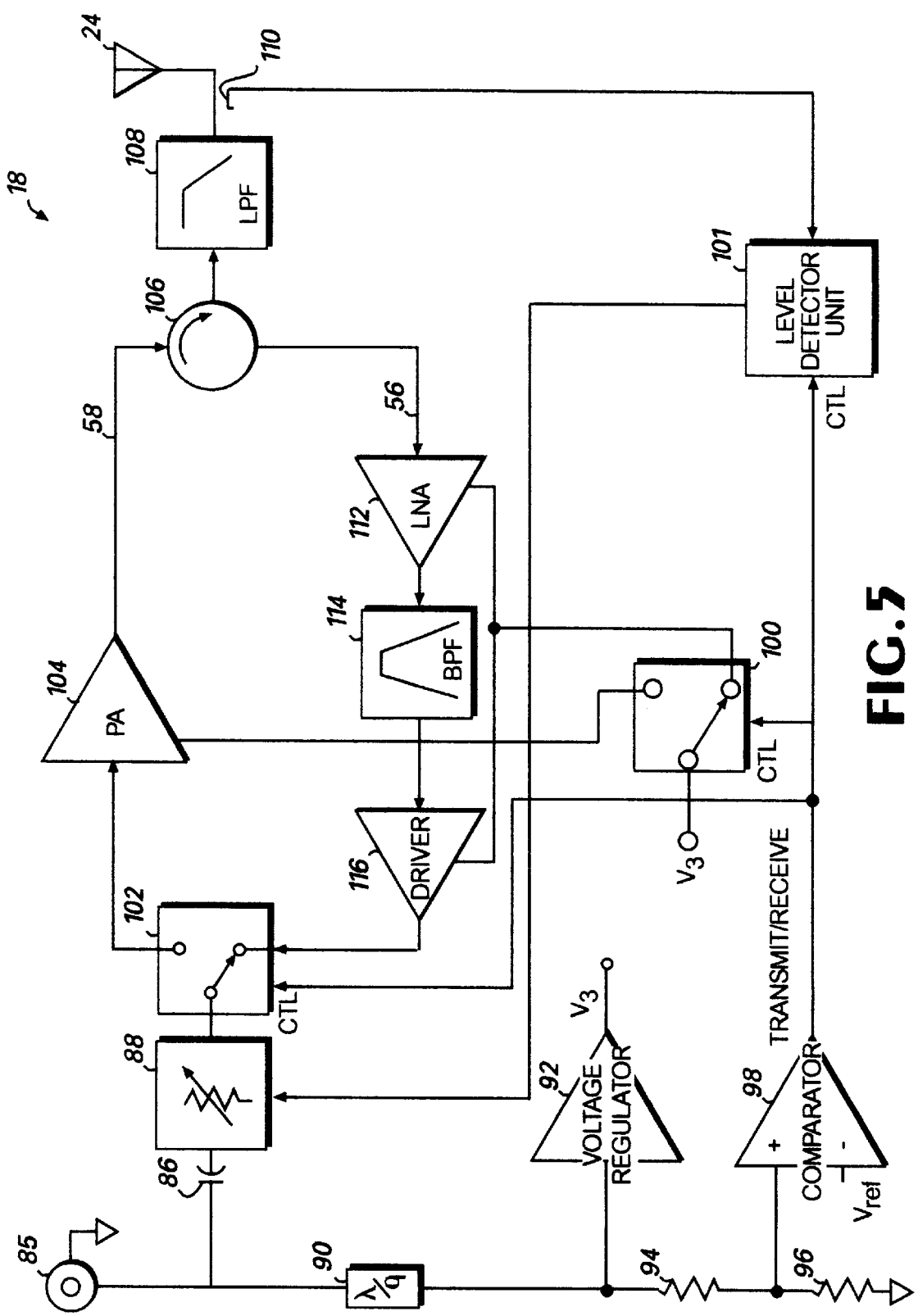
FIG. 5 is a block diagram illustrating the preferred embodiment of a repeater of the data communications system provided by the present invention.

FIG. 5 is a block diagram illustrating the principal components of the preferred embodiment for the repeater 18. For the preferred repeater 18, electrical power is supplied by the base station 12 to each repeater 18 via a communications link 26. The communications link 26 is also used to distribute control signals from the base station 12 to control the operating state of the repeater 18. These control signals determine whether the repeater 18 is operating in the transmit mode or in the receive mode by controlling the selection of either the transmit path or the receive path. The control signals are also useful for biasing the amplifiers of the repeater 18 to allow the amplifier(s) within the selected path to be powered while the amplifier(s) in the remaining path are powered down. Advantageously, the preferred repeater 18 is connected to the base station 12 by only a single bidirectional communications cable, the communications link 26, which is capable of distributing incoming and outgoing data packets, electrical power and control signals.

Turning now to FIGS. 1 and 5, the communications link 26 is connected to a connection point 85 to link the base station 12 to the preferred repeater 18. A variable attenuator 88 is connected to the connection point 85 via a direct current (DC)-blocking capacitor 86. One terminal of the DC-blocking capacitor 88 is connected to the common node formed by the junction of a quarter-wave isolation device 90 and the connection point 85, and the remaining terminal is connected to the variable attenuator 88.

In the transmit state, outgoing data transmitted by the base station 12 is passed to the variable attenuator 88 via the DC-blocking capacitor 86. Alternatively, in the receive state, amplified incoming data is passed by the variable attenuator 88 to the connection point 85 via the DC-blocking capacitor 86. The DC-blocking capacitor 86 filters signals distributed between the connection point 85 and the variable attenuator 88 by blocking the DC components of these signals. The variable attenuator 88 is useful for controlling the RF power level of the RF signals distributed by the repeater 18.

A power signal, generated by the base station 12 and carried by the communications link 26, is supplied to (1) a voltage regulator 92 via the isolation device 90 and (2) a comparator 98 via a divider circuit formed by the combination of resisters 94 and 96. The isolation device 90 prevents the RF signal of outgoing data or incoming data from reaching the control logic circuitry of the repeater 18 by filtering the RF signal components. The isolation device 90 is preferably implemented as a quarter-wavelength transmission line.

The voltage regulator 92 accepts the power signal from the isolation device 90 and, in response, outputs a regulated power signal $V_3$ for powering the active devices of the repeater 18. Specifically, the voltage regulator 92, which is preferably implemented by a linear voltage regulator device, distributes the regulated power signal $V_3$ to the amplifiers in the receive path 56 and the transmit path 58. A bias switch 100, which is connected between the output of the voltage regulator 92 and the power supply inputs of the amplifiers of the receive and transmit paths 56 and 58, controls the distribution of the regulated power signal $V_3$ to support selective biasing of the amplifiers.

The divider circuit, which is formed by the combination of the resistors 94 and 96, divides the voltage of the power signal in a predefined manner for input to the comparator 98. The resistor 94 is connected between (1) a common node formed by the connection of the isolation device 90 and the input of voltage regulator 92 and (2) a common node formed by a terminal of the resistor 96 and the positive input port of the comparator 98. The remaining terminal of the resistor 96 is connected to ground. The values of the resistors 94 and 96 are selected to supply a predetermined voltage level to the positive input port of the comparator 98 in response to the level of the power signal. A reference voltage $V_{REF}$ is supplied to the remaining input port of the comparator 98. Consequently, the comparator 98 operates to compare the reference voltage $V_{REF}$ to the voltage applied to the positive input port. In the event that the voltage applied to the positive input port is greater than the reference voltage $V_{REF}$, the data communications system 10 is operating in the transmit mode. In contrast, if the voltage at the positive input port is at or below the reference voltage $V_{REF}$, then the data communications system 10 is operating in the receive mode. In view of the foregoing, it will be understood that the power signal carried by the communications link 26 is used by the repeater 18 (1) to determine whether the data communications system 10 is operating in the transmit state or the receive state and (2) to power to active circuitry of the repeater 18.

The comparator 98 outputs a control signal having one of two control states, a first control state representing the transmit mode and a second control state representing the receive mode. The comparator 98 outputs a control signal having the first control state when the voltage applied to the positive input port is greater than the reference voltage $V_{REF}$. In the event that the reference voltage $V_{REF}$ is less than or equal to the voltage applied to the positive input port, the comparator 98 generates a control signal having the second control state. The control signal is distributed by the comparator 98 to the bias switch 100, a switch 102, and a level detector unit 101.

The variable attenuator 88, which is connected between the DC-blocking capacitor 86 and the common port of the switch 102, can set the RF power level for signals supplied by the receive path 56 to be supplied to the transmit path 58. For example, the variable attenuator 88 can be used to simplify the installation of the repeater 18 by supplying a known amount of loss within the signal path between the base station 12 and the antenna 24. The switch 102 operates to selectively connect the variable attenuator 88 either to the receive path 56 or to the transmit path 58. The switch 102 is preferably implemented by a single pole, double throw switch. For the normally closed position of the switch 102, the receive path 56 is connected to the variable attenuator 88 and the transmit path 58 remains disconnected from the attenuator 88. Otherwise, the switch 102 connects the transmit path 58 to the variable attenuator 88, and the receive path 56 is disconnected from the variable attenuator 88.

The operating state of the switch 102 is controlled by the particular state of the control signal output by the comparator 98. In response to a control signal having the first control state (transmit mode), the wiper of the switch 102 connects the output of the variable attenuator 88 to the transmit path 58. In contrast, the switch 102 responds to a control signal having the second control state (receive mode) by connecting the receive path 56 to the input of the variable attenuator 88.

The transmit path, which includes a power amplifier 104, is connected between the normally open contact of the switch 102 and the circulator 106. In contrast, the receive path 56 is connected between the normally closed contact of the switch 102 and the circulator 106. The receive path 56 includes a band pass filter 114 connected between a low noise amplifier 112 and a driver amplifier 116. The input of the low noise amplifier 112 is connected to the circulator 106, whereas the output of the driver amplifier 116 is connected to the normally closed node of the switch 102. The power amplifier 104, the low noise amplifier 112, and the driver amplifier 116 are selectively connected to the output of the voltage regulator 92 via the bias switch 100.

The common port of the bias switch 100 is connected to the regulated power signal $V_3$ supplied by the voltage regulator 92. The normally closed contact is connected to the low noise amplifier 112 and the driver amplifier 116, whereas the normally open contact is connected to the power amplifier 104. In the event that the control signal output by the comparator 98 is set to the first control state (transmit mode), the bias switch 100 connects the regulated power signal $V_3$ to the power supply input of the power amplifier 104. In contrast, if the control signal is set to the second control state (receive mode), then the bias switch 100 connects the regulated power signal $V_3$ to the power supply inputs of the low noise amplifier 112 and the driver amplifier 116.

A low pass filter 108 is connected between the antenna 24 and the circulator 106. The circulator 106 operates to direct the amplified outgoing data from the transmit path 58 to the antenna 24. In similar fashion, the circulator 106 directs the incoming data from the antenna 24 to the receive path 56. Both amplified outgoing data and incoming data are passed via the low pass filter 108 to filter undesired out-of-band frequency components, such as harmonic components.

A coupler 110 is connected between the antenna 24 and the level detector unit 101. During the transmit state, the coupler 110 can couple a portion of the amplified outgoing data to the level detector unit 101. The level detector unit 101 accepts as inputs the control signal output by the comparator 98 and the coupled signal from the coupler 110, and outputs a control signal to control the attenuation level of the variable attenuator 88.

The level detector unit 101 functions as an automatic level controller for the repeater 18 by controlling the attenuation level of the variable attenuator 88. The variable attenuator 88 can be used to attenuate the RF level of transmitted outgoing data, as required, to avoid driving the power amplifier 104 into a compression state. Likewise, the variable attenuator 88 can control the RF level of amplified incoming data to prevent driving the receiver 31 of the base station 12 into a saturation state. Based on the state of the control signal output by the comparator 98, the level detector unit 101 can determine whether the data communications system 10 is operating in the transmit or the receive state. In response to the control signal, as well as the detected power level of the signal coupled by the coupler 110, the level detector unit 101 sets the attenuation level of the variable attenuator 88.

The level detector unit 101 is preferably implemented by the combination of an envelope detector and a controller. In the transmit state, the coupler 110 samples the amplified outgoing data and supplies the coupled signal to the envelope detector. In turn, the envelope detector detects the level of the coupled signal and outputs a detected signal to the controller. The controller responds to the detected level by determining the desired attenuation level based on information stored in look-up tables. The controller then outputs a control signal representing the desired attenuation level to the attenuator 88. Because the controller operates as a sample and hold circuit, the level detector unit 101 "holds" this control signal, until the controller outputs another control signal. Consequently, the level detector unit 101 can "hold" the value of the control signal during the receive state to insure that the attenuation level, originally set during the transmit state, remains constant during the receive state.

The level detector unit 101 supplies an automatic level control function for the repeater 18 by sampling the power level of the repeater's output during the transmit state and adjusting the attenuation level of the attenuator 88 (as required). The amplified outgoing data is sampled by the level detector unit 101 because signal level characteristics for the base station 12, the communications link 26, and the repeater 18 are known, whereas there exists an absence of advance knowledge about the link between the repeater 18 and a remote terminal 16. Consequently, adjustments of the attenuation level for the attenuator 88 are conducted by the level detector 101 only during the transmit state.

Turning now to a review of the operation of the preferred repeater 18, in the transmit mode, the communications link 26 carries outgoing data and an electrical power signal. The outgoing data represents the transmit signal of outgoing data from the transmitter 33, whereas the power signal is generated by a power source of the base station 12. The power signal serves dual functions, specifically a power function for powering the active circuitry of the repeater 18, and a control function for controlling the operating state of the repeater 18, i.e., transmit state or receive state.

For the transmit state, the transmit outgoing data is supplied by the communications link 26 to the variable attenuator 88 via the DC-blocking capacitor 86. In contrast, the power signal is supplied by the communications link 26 to the control circuitry of the repeater 18 via the isolation device 90. The voltage regulator 92 receives the power signal directly from the isolation device, whereas the comparator 98 receives the power signal via the combination of the resistors 94 and 96. The voltage regulator 92 outputs the regulated power signal $V_3$ for powering each of the active devices of the repeater 18, specifically the power amplifier 104, the low noise amplifier 112, and the driver amplifier 116. In addition, the regulated power signal $V_3$ provides the operating power for the control circuitry of the repeater 18. It will be appreciated that the voltage level for the power signal, which is supplied as an input to the voltage regulator 92, is greater than the voltage level of the regulated power signal $V_3$ output by the regulator 92.

Based on the voltage level of the power signal, the comparator 98 outputs a control signal having one of two control states, a first state (transmit mode) or a second state (receive mode). The control signal output by the comparator 98 is applied to the bias unit 100, the level detector unit 101, and the switch 102. The control signal controls the operating state of each of the switches 100 and 102 and advises the level detector unit 101 of the operating state of the repeater 18. For purposes of the example described herein, the power signal has a higher voltage level for the transmit state than for the receive state. Moreover, the higher voltage level for the transmit state is greater than the reference voltage $V_{REF}$ applied to the comparator 98. Consequently, in the transmit state, the comparator 98 outputs a control signal set to the first state.

The variable attenuator 88 passes the transmitted outgoing data to the common port of the switch 102. Depending on the operating state of the switch 102, the common port is connected either to the receive path 56 or to the transmit path 58. In the transmit state, the transmitted outgoing data is passed by the switch 102 to the input of the power amplifier 104. The power amplifier 104 accepts the transmitted amplified data and, in turn, outputs an amplified version of this radio frequency signal.

The power amplifier 104 is biased to the "ON" state because the bias switch 100 is passing electrical power, the voltage $V_3$, from the voltage regulator 92 to the power supply input of the power amplifier 104 in response to receipt of the control signal from the comparator 98. Because the bias switch 100 is operating in the transmit mode, the amplifiers of the receive path 56 do not receive electrical power from the voltage regulator 92. The low noise amplifier 112 and the driver amplifier 116 are "turned off" to prevent the likelihood of oscillation by the amplifiers of the receive path 56 and the transmit path 58 as a result of signal leakage.

The circulator 106 forwards the amplified outgoing data from the power amplifier 104 to the low pass filter 108. The low pass filter 108, which filters the high frequency components of the amplified outgoing data, forwards a filtered version of the amplified outgoing data to the antenna 24. In particular, the low pass filter 108 removes the undesired harmonic components of the amplified outgoing data prior to transmission of this RF signal to the repeaters 18 via the antenna 24.

The coupler 110 couples a sample of the amplified outgoing data from the output of the low pass filter 108. The coupled signal is supplied to the level detector unit 101 to facilitate the detection of the power level for the amplified outgoing data. The envelope detector of the level detector unit 101 detects the power level of the coupled signal. In turn, the detected power level is sampled by a sample and hold function provided by the controller of the level detector unit 101. Based on this sample, the controller determines whether to adjust the attenuation level of the variable attenuator 88. This decision is supported by look-up tables that list detected values for amplified outgoing data and corresponding attenuation levels for the variable attenuator 88. In response to a control signal from the level detection unit 101, the variable attenuator 88 sets a predetermined attenuation level for the repeater 18 to provide a known loss characteristic between the base station 12 and the repeater 18 regardless of the transmission medium used for the communications link 26. In this manner, the variable attenuator 88 can control the signal level entering the power amplifier 104, thereby enabling the selection of the proper drive level for the power amplifier 104 to obtain the desired output power level. The variable attenuation level is set by the variable attenuator 88 during the transmit state and remains constant for the receive state.

The repeater 18 transitions from the transmit state to the receive state in response to a transition of the voltage level for the power signal supplied by the communications link 26. In particular, when the voltage level for the power signal is less than or equal to the reference voltage $V_{REF}$ of the comparator 98, the comparator 98 outputs a control signal having a second control state representing the receive mode. In response to this control signal, the wipers of the switches 100 and 102 transition to the normally closed operating state. In this manner, the switch 100 connects the output of the voltage regulator 92 to the power supply input of each of the amplifiers 112 and 116 of the receive path 56. Also, the switch 102 connects the variable attenuator 88 to the receive path 56. This control signal also serves to advise the level detector unit 101 that the data communication system has now entered the receive state.

In the receive state, incoming data is received from the remote terminals 16 via the antenna 24. The incoming data is passed by the antenna 24 to the circulator 106 via the low pass filter 108. The circulator 106 directs the incoming data from the low pass filter 108 to the input of the low noise amplifier 112. The low noise amplifier 112 amplifies the incoming data and generates amplified incoming data. The amplified incoming data is filtered by the band pass filter 114 to remove out-of-band frequency components. In addition, the band pass filter 114 provides a proper impedance match between the output of the low noise amplifier 112 and the input of the driver amplifier 116. The driver amplifier 116 accepts the amplified incoming data and, in turn, generates a further amplified version of the signal. This allows the repeater 18 to drive the communications link 26 with a sufficient power level for proper reception of the amplified incoming data by the receiver 31. The output of the driver amplifier 116 is supplied to the variable amplifier 88 via the signal path provided by the switch 102.

The variable attenuator 88 attenuates the amplified incoming data based on the selected attenuation level previously set during the transmit mode. Specifically, in the receive mode, the level detector unit 101 holds the attenuator 88 at the attenuation level used for the transmit state. Consequently, the attenuation level for the receive path 56 is identical to the attenuation level for the transmit path 58. The attenuated signal is forwarded by the variable attenuator 88 to the communications link 26 via the DC-blocking capacitor 86.

For the preferred repeater 18, the power amplifier 104 is implemented as 40 dB power amplifier. For the preferred repeater 18, the amplified outgoing data has an RF power level of approximately +20 dBm. The low noise amplifier 112 and the driver amplifier 116 supply at least 40 dB of gain in the receive path. In particular, the amplifiers 112 and 116 can supply slightly more than 40 dB of gain in the receive path to overcome the loss characteristic of the front-end of the receiver 31 of the base station 12. By supplying slightly more gain in the receive path 56 than the transmit path 58, the signal reception performance of the base station 12 can be improved by slightly decreasing the noise characteristic for the receiver 31.

It will be appreciated that the low-pass filter 108 can be inserted between the power amplifier 104 and the circulator 106 to slightly improve the noise figure for the repeater 18. Specifically, the low-pass filter 108 is primarily used to filter harmonics generated in the transmit mode by the power amplifier 104. Consequently, the low-pass filter 108 can be inserted within the transmit path 58 rather than between the circulator 106 and the antenna 24 without decreasing performance in the receive path 56.

Figure 6:
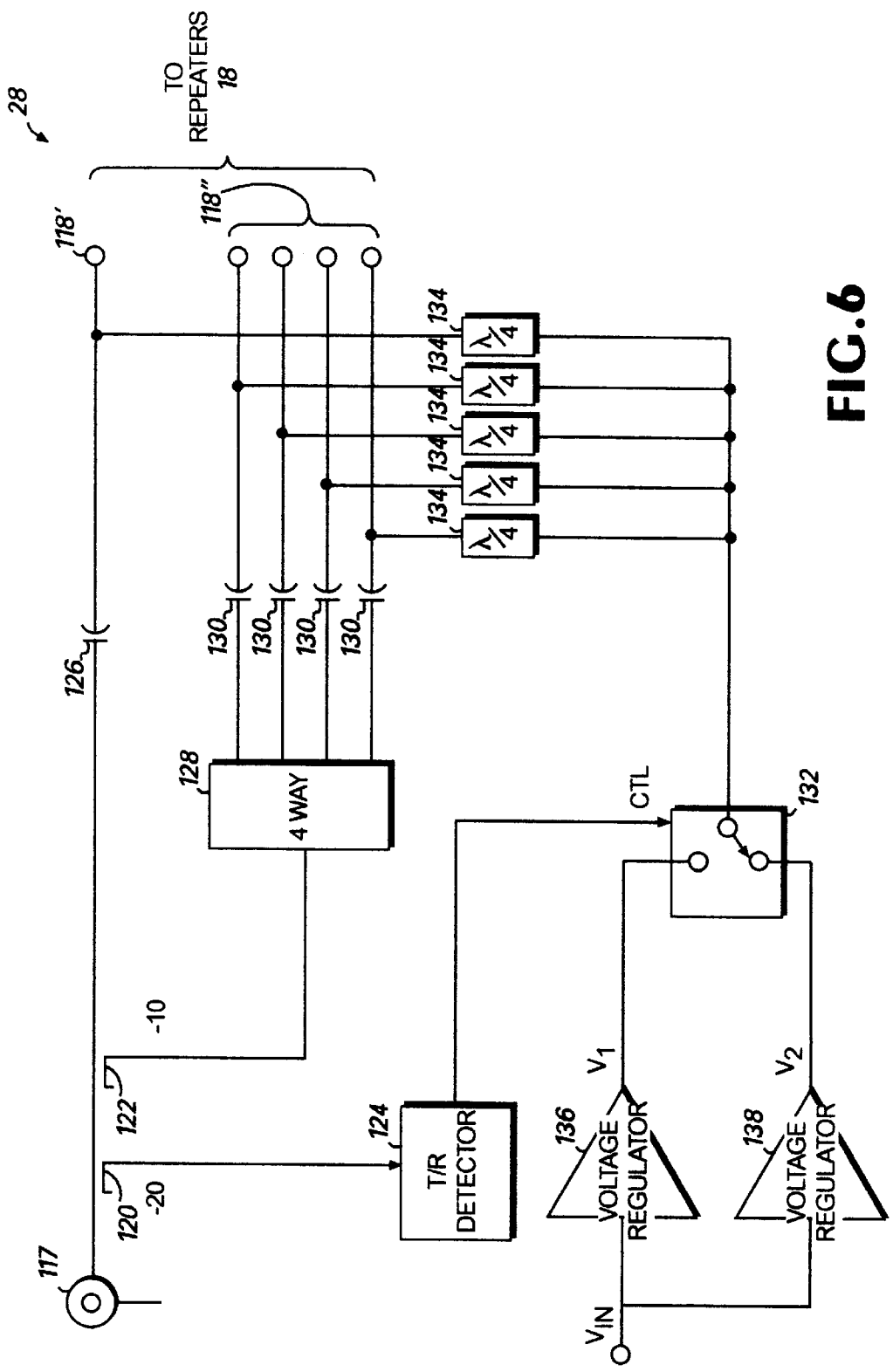
FIG. 6 is a block diagram illustrating the preferred signal processor of the data communications system provided by the present invention.

FIG. 6 is a block diagram illustrating the principal components of the preferred signal processors of the data communications system. Referring now to FIGS. 1, 5, and 6, the preferred signal processor 28 is connected between the transceiver 30 and each first communications link 26. A common port 117 of the signal processor 28 is connected to the transceiver 30 via the signal path 32. The communications links 26 are connected to the signal processor 28 at the ports 118' and 118". The port 118' represents a throughput port, whereas the ports 118" represent divided ports. The through port 118' is connected to the common port 117 via a combination of couplers 120 and 122 and a DC-blocking capacitor 126. Each of the couplers 120 and 122 sample signals traveling between the common port 117 and the through port 118' and respectively supply coupled signals to the transmit/receive detector 124 and to a signal combiner/divider 128. The divided ports 118" are connected to the signal combiner/divider 128 via DC-blocking capacitors 130. The DC-blocking capacitors 126 and 130 respectively block DC-level signals from entering the RF circuitry of the signal processor 28.

The transmit/receive detector 124 is connected between a switch 132 and the coupled port of the coupler 120. The transmit/receive detector 124 detects the operating state of the transceiver 30, i.e., whether the transceiver 30 is operating in the transmit state or in the receive state. The transmit/receive detector 124 is preferably implemented as an envelope detector for detecting the level of the coupled signal supplied by the coupler 120. The envelope detector of the transmit/receive detector 124 can detect the different levels associated with incoming and outgoing data and, in response, output a control signal having one of two distinct control states. If the base station 12 is operating in the transmit mode, then the control signal has a first control state representing the transmit mode. In contrast, if the base station 12 is operating in the receive mode, then the control signal has a second control state representing the receive mode. For the preferred embodiment, the control states can be represented by the binary states of logical high and logical low levels. For example, the first control state can be represented by a logical high level and the second control state can be represented by a logical low level. The operating state of the switch 132 is controlled by the control signal output by the transmit/receive detector 124.

The common port of the switch 132 is connected to the port 118' and each of the ports 118" via quarter-wave isolation devices 134. Each of the quarter-wave isolation devices 134 prevent RF signals from entering the control circuitry of the power divider 28, while allowing DC-level signals to pass from the control circuitry to the ports 118' and 118".

A voltage regulator 136 is connected between a power source $V_{IN}$ and the normally open contact of the switch 132. A voltage regulator 138 is connected between the power source $V_{IN}$ and the normally closed contact of the switch 132. Consequently, the wiper of the switch 132 can selectively connect the common port of the switch 132 either to the output of the voltage regulator 136 or to the output of the voltage regulator 138. The voltage regulator 136 accepts an electrical power signal having a voltage $V_{IN}$ from the power source $V_{IN}$ and, in response, generates a regulated voltage $V_1$. In similar fashion, the voltage regulator 138 outputs a regulated voltage $V_2$ in response to the electrical power signal output by the power source $V_{IN}$. For the preferred embodiment, the voltage $V_{IN}$ is greater than the voltage $V_1$, and the voltage $V_1$ is greater than the voltage $V_2$. Each of the voltages $V_{IN}$, $V_1$, and $V_2$ is greater than the voltage $V_3$ of the repeater 18.

When the data communications system 10 is operating in the transmit mode, the switch 132 connects the output of the voltage regulator 136 to the through port 118' and the divided ports 118". In contrast, if the data communication system 10 is operating in the receive mode, then the output of the voltage regulator 138 is connected to the through port 118' and to the divided ports 118". Consequently, the voltage $V_1$ is associated with the transmit mode, whereas the voltage $V_2$ is associated with the receive mode. The voltage level supplied to the ports 118' and 118" via the switch 132 determines whether the comparator 98 of the repeater 18 outputs a control signal representing the transmit mode or the receive mode. In contrast, the voltage regulator 92 of the repeater 18 outputs a regulated power signal $V_3$ regardless of whether the switch 132 passes the regulated voltage $V_1$ or the regulated voltage $V_2$.

In view of the foregoing, it will be appreciated that the voltage level for the power signal output via the ports 118' and 118" determines whether the repeater 18 is operating in the transmit mode or the receive mode. The power signal output by the ports 118' and 118" is also used for powering the circuitry of the repeater 18. Significantly, a single communications link 26 can carry a RF signal associated with incoming or outgoing data, as well as transport the power signal for powering the repeater 18 and for controlling the operating state of the repeater 18.

The through port 118' represents a throughput signal path between the common port 117 and the through port 118'. Consequently, the signal level for RF signals transported by this through path have a higher signal level than the RF signals coupled by the coupler 122 and subsequently divided by the signal combiner/divider 128. Specifically, for the embodiment shown in FIG. 6, the through path 118' has a path loss of approximately 1 dB, whereas each of the four divided paths between the signal combiner/divider 128 and the ports 118" has a path loss of approximately 17 dB. Thus, each of the divided ports 118" exhibit greater path loss than the through port 118'. The through port 118' can be connected to a communications link 26 having a much greater length than a communications link 26 connected to the divided port 118" because of the higher signal levels associated with the through port 118'. Significantly, this provides an installer of the data communications 10 with increased flexibility by supporting the use of at least one extended cable between a selected repeater 18 and the base station 12.

Turning now to the operation of the signal processor 28, in the transmit state, the transmitted outgoing data is passed from the signal path 32 to the common port 117 of the signal processor 28. The couplers 120 and 122 couple a sample of the transmitted outgoing data for respective distribution to the transmit/receive detector 124 and to the signal combiner/ divider 128. In response to the transmitted outgoing data, the transmit/receive detector 124 determines that the data communications system 10 is operating in the transmit mode. Accordingly, the transmit/receive detector 124 outputs a first control signal representing the transmit mode to the switch 132. In response to the control signal, the switch 132 connects the output of the voltage regulator 136 to each of the ports 118' and 118" via the quarter-wave isolation devices 134. In this manner, a power signal having the voltage $V_1$ is supplied to each of the communications links 26 connected to the ports 118' and 118" during the transmit mode.

In the transmit mode, the coupler 122 passes a sample of the transmitted outgoing data to the signal combiner/divider 128 which, in turn, outputs divided versions of the transmitted outgoing data to the ports 118". Thus, the through port 118' outputs the transmitted outgoing data supplied by the signal path 32, whereas the ports 118"'output divided versions of the transmitted outgoing data. Each of the ports 118' and 118" further output the power signal having the voltage $V_1$ to power the active circuitry of the repeater 18 and to select the transmit mode for the repeater 18.

In the receive mode, the ports 118' and 118" receive amplified incoming data via the communications link 26. The through signal path of the through port 118' forwards the amplified incoming data to the common port 117 via the DC-blocking capacitor 126, the coupler 122, and the coupler 120. In contrast, the divided ports 118" pass the incoming amplified data via DC-blocking capacitors 130 to the signal combiner/divider 128. At this point, the amplified incoming data passed by the divided ports 118" are combined by the signal combiner/divider 128. This combined signal is then forwarded to the common port 117 via the coupler 122 and the through path of the coupler 120.

The quarter-wave isolator device 90 of FIG. 5 and the quarter-wave isolator devices 134 of FIG. 6 are preferably implemented by a microstrip design on a printed circuit board. Likewise, the coupler 110 of FIG. 5 and the couplers 120 and 122 of FIG. 6 are preferably implemented by microstrip designs on printed circuit boards.

Figure 7A:
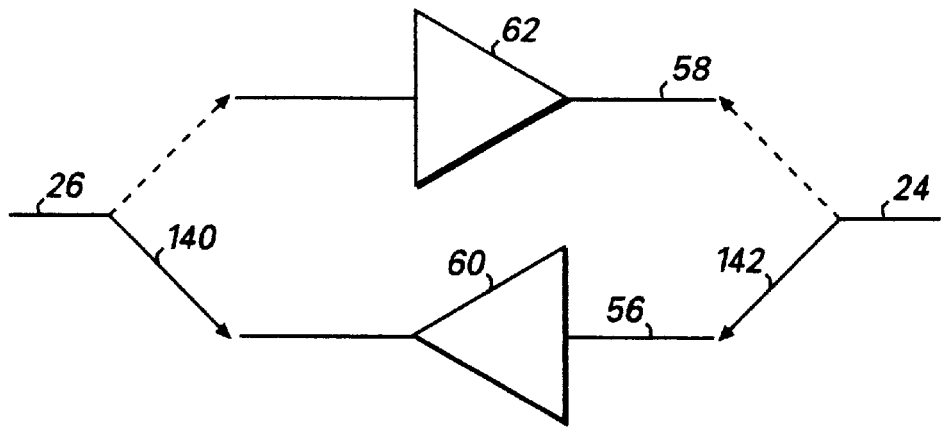
FIGS. 7A, 7B, and 7C, collectively described as FIG. 7, are block diagrams illustrating various embodiments of a repeater for the data communications system of the present invention.
Figure 7B:
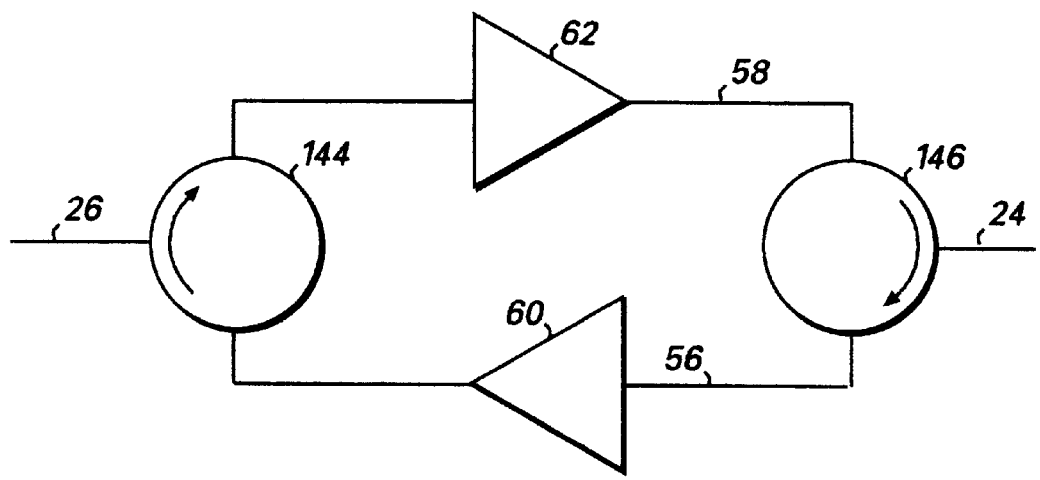
Figure 7C:
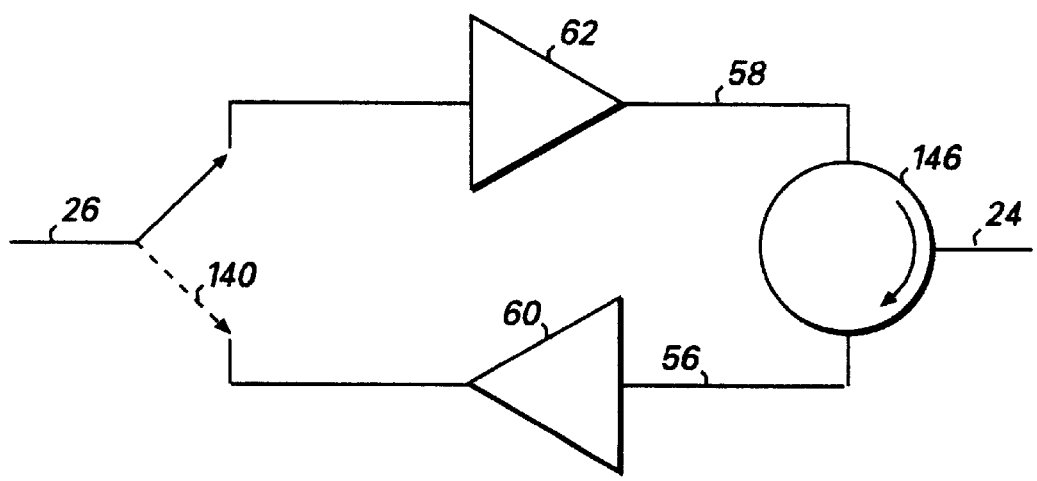

FIGS. 7A, 7B, and 7C, collectively described as FIG. 7, are block diagrams illustrating alternative embodiments for a repeater of the data communications system for the present invention. FIG. 7A is a block diagram illustrating the use of switches for switching between the receive and transmit paths of a repeater. FIG. 7B is a block diagram illustrating the use of circulators for switching between the-receive and transmit paths of a repeater. FIG. 7C is a block diagram illustrating a hybrid approach for switching between the receive and transmit paths of the repeater, namely the use of both a switch and a circulator.

Turning now to FIGS. 1 and 7A, the repeater 18 concludes a receive path 56 and a transmit path 58 connected between a first switch 140 and a second switch 142. The first switch 140 which is connected to the first communications link 26 can operate in a pair of operating states. For the first operating state, the switch 140 connects the communications link 26 to the input of the transmit amplifier 62. In contrast, for the second state, the switch 140 connects the communications link 26 to the output of the receive amplifier 60. In similar fashion, the switch 142 also has two separate operating states, a first state for connecting the antenna 24 to the output of the transmit amplifier 62 and a second operating state for connecting the antenna 24 to the input of the receive amplifier 60. To forward outgoing data from the base station 12 to the remote terminals 16 via the repeater 18, the switches 140 and 142 operate in the first operating state to connect the transmit path 58 between the communications link 26 and the antenna 24. In contrast, to pass incoming data from a remote terminal 16 to the base station 12, the switches 140 and 142 operate in the second operating state to connect the receive path 56 between the antenna 24 and the communications link 26.

It will be appreciated that the control of the operating states for the switches 140 and 142 can be implemented by supplying control signals from the base station 12 to repeater 18 via a control link. In the alternative, the control signals can be supplied by the base station 12 to the repeater 18 via the communications link 26. Furthermore, an internal detection system can be employed to allow a repeater 18 to detect the source of the signal to be repeated, thereby eliminating any requirement for a control link between the base station 12 and the repeater 18.

Turning now to FIGS. 1 and 7B, circulators 144 and 146 are connected between the receive path 56 and the transmit path 58. A circulator 144 is connected to the first communications length 28 and between the input of the transmit amplifier 62 and the output of the receive amplifier 60. In contrast, the circulator 146 is connected to the antenna 24 and the input of the receive amplifier 60 and the output of the transmit amplifier 62. In response to an outgoing signal forwarded by the communications link 26, the circulator 144 operates to pass this signal to the transmit path 58. In addition, the circulator 146 responds to the amplified outgoing data by passing this signal to the antenna 24. The circulator 146 also responds to incoming data forwarded by the antenna 24 by distributing this signal to the receive path 56. In turn, the circulator 144 accepts the amplified incoming data and forwards this signal to the communications link 26.

Referring now to FIGS. 1 and 7C, the switch 140 and the circulator 146 are used to provide a hybrid approach for signal distribution within the repeater 18. The switch 140 operates in the first operating state to forward outgoing data to the transmit path 58. In response to amplified outgoing data transmitted by the transmit amplifier 62, the circulator 146 directs the amplified outgoing data to the antenna 24 for transmission to the remote terminals 16. The circulator 146 also accepts incoming data from the antenna 24 and routes this signal to the receive path 56. The switch 140 operates in the second state to forward amplified incoming data from the receive amplifier 60 to the communications link 26. As described above, with respect to FIG. 8A, the switch 140 requires a control mechanism for controlling the operating state of this switch. In contrast, the circulator 146 is a passive device requiring no active control mechanism.

Turning now to FIG. 1, it will be appreciated that a variety of antennas can be used to implement the antenna system 24 of the repeater 18. In general, the selection of a particular antenna for the repeater 18 is based on the specific application and the actual implementation of the data communications system 10. For example, a repeater 18 can be mounted along a ceiling of a building to maximize the coverage area for this in-building environment. For a ceiling mount, the antenna is preferably a down-tilt model for which the primary lobe of the antenna pattern is directed at an angle toward the floor of the building. For example, the tilt angle of the primary lobe can extend 45 degrees or more below the base level defined by the ceiling. Other antennas can have omni directional pattern, a cartoid antenna pattern, or a sectored antenna pattern.

For the repeaters 18, the polarization of the antenna 24 can be vertical polarization, horizontal polarization, or a combination of these polarizations. Indeed, the antenna system 24 can be implemented by a pair of antennas, specifically a receive antenna for the receive path and a transmit antenna for the transmit path. Polarization diversity can be achieved by the use of separate antennas for the transmit and receive paths of the repeater 18 because a particular polarization can be selected for one path and the opposite polarization can be selected for the remaining path. The antenna system 24 also can be implemented as an antenna having circular polarization.

The use of conventional directional antennas, as well as known polarization techniques, can be used with file data communications system 10 to reduce the multipath phenomenon that commonly arises within an in-building communications environment or a densely populated outdoor communications environment. In particular, it will be appreciated that polarization diversity can lead to signal reception enhancement and can serve to minimize the effects of multipath.

As described above with respect to FIG. 5, it is necessary to supply electrical power to the repeaters 18 because each repeater 18 contains one or more amplifiers. The repeaters 18 can be powered by conventional DC or alternating current (AC) electrical power sources. As shown in FIGS. 5 and 6, DC power can be distributed to the repeaters 18 via the communications link 26 or, alternatively, by a separate power link. Likewise, AC electrical power can be distributed via the communications link 26 or by a separate power link. Furthermore, local power sources can be used by each repeater 18, such as a solar cell or a battery, to power the active device(s) of the repeater 18. If a battery is used to power the repeater 18, then a trickle charge design is preferably used to conserve the useful lifespan of the battery.

Figure 8A:
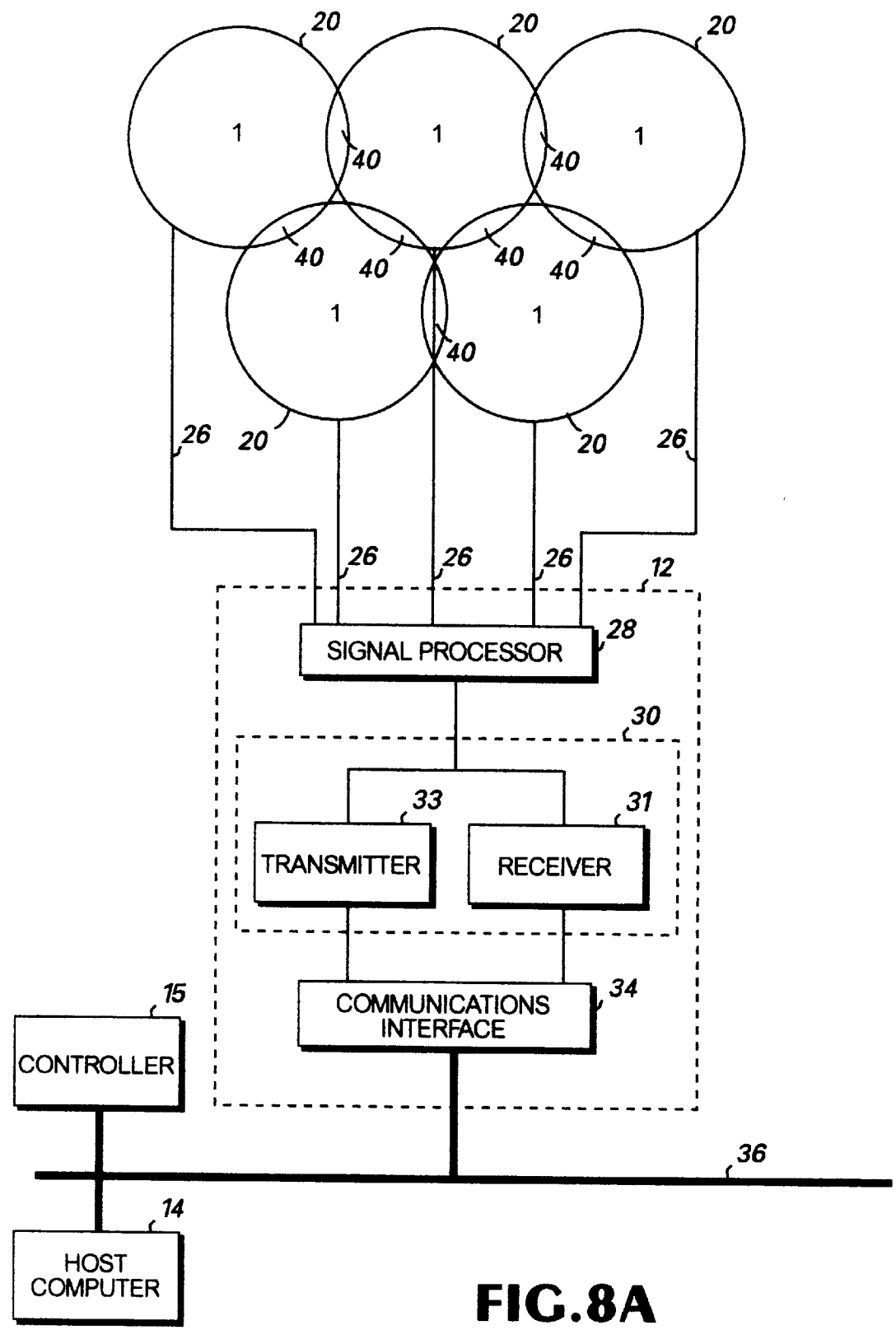
FIGS. 8A, 8B, 8C, and 8D, collectively described as FIG. 8, are diagrams illustrating various communications coverage patterns created by the use of one or more base stations within the data communications system of the present invention.

FIGS. 8A–8D are diagrams illustrating various communications applications of the present invention. FIG. 8A shows the use of a single base station 12 connected to multiple repeaters 18, each having its own coverage area. The combined coverage areas form the predetermined area 22 for communications between the base station 12 and the remote terminals 16. Each of the coverage areas 20 has the same frequency hopping sequence because each of the repeaters 18 is connected to the same base station. This base station 12 has a particular frequency hopping sequence that is effectively "repeated" by the repeater 18 within their respective coverage areas 20. Consequently, a roaming remote terminal can move from one coverage area 20 to the next with minimal impact upon communications with the base station 12 because the frequency hopping sequence remains the same in all coverage areas.

As shown in FIG. 8A, adjacent coverage areas slightly overlap and share a common overlap area 40. The inventors have determined that the combination of transmitted signals within an overlap region of coverage areas can result in possible constructive and destructive interference effects that interfere with proper reception of the signal. These interference effects are a result of the use of the same predetermined frequency hopping sequence for communications between the base station 12 and the remote terminals 16 in each of the coverage areas 20. For example, there exists the possibility that signals output by the repeaters 18 for the coverage areas sharing the overlap area 40 will have the same frequency and be received by the remote terminal 16 at or about the same time. This combination of a pair of simultaneously transmitted signals within the overlap region can result in the remote terminal receiving an outgoing data signal having a deep null because of the equal or near equal amplitude and opposite phase characteristics of the transmitted signals. A compensation technique can be used to minimize this interference effect by compensating for the variation of electrical lengths of the communication links 26 extending between the base station 12 and the repeaters 18. Various compensation techniques will be described in more detail below with respect to FIG. 11.

Figure 8B:
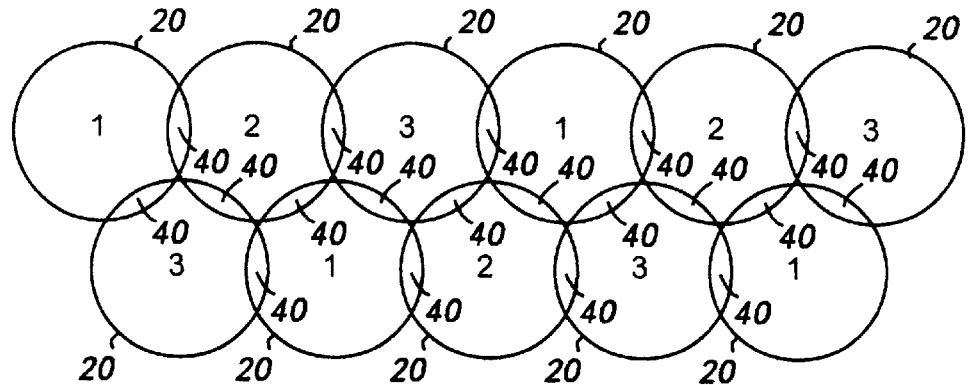

FIG. 8B is a diagram illustrating the coverage areas formed by three separate base stations, each connected to their own set of repeaters, to form a data communications system. Each of these base stations has its own unique frequency hopping sequence. Accordingly, the set of coverage areas 20 for a particular base station is associated with the particular frequency hopping sequence of that base station. Although neither the base stations nor their respective repeaters are shown in FIG. 8B (or FIGS. 8C and 8D), it will be understood that the frequency hopping sequence for transmissions occurring within the coverage areas 20 identified by the number "1" is different from the frequency hopping sequence for transmissions within the coverage areas 20 identified by the numbers "2" and "3". The transmissions occurring within each set of coverage areas identified by a particular number are associated with a unique frequency hopping sequence because the frequency hopping sequences among these base stations are different.

Adjacent coverage areas are associated with different base stations to prevent the simultaneous transmission of frequency carriers having the same frequency within an overlap area 40. This reduces the possibility for interference caused by the simultaneous reception of two or more transmitted signals having the same frequency carrier, equal or near equal amplitudes, and opposite phase characteristics. Significantly, coverage areas identified by the same reference number, i.e., those coverage areas representing the same frequency hopping sequence, are not placed adjacent to each other to minimize the possibility of constructive and destructive interference effects within the resulting overlap area 40.

For the example shown in FIG. 8B, the coverage areas 20 identified by the number "1" are associated with the first base station; the coverage areas 20 marked by the number "2" are associated with the second base station; and the coverage areas 20 marked by the number "3" are associated with the third base station. The frequency coverage pattern illustrated in FIG. 8B prevents the simultaneous transmission of frequency carriers having the same frequency within adjacent coverage areas, thereby reducing the possibility for interference within the overlap areas 40.

Figure 8C:
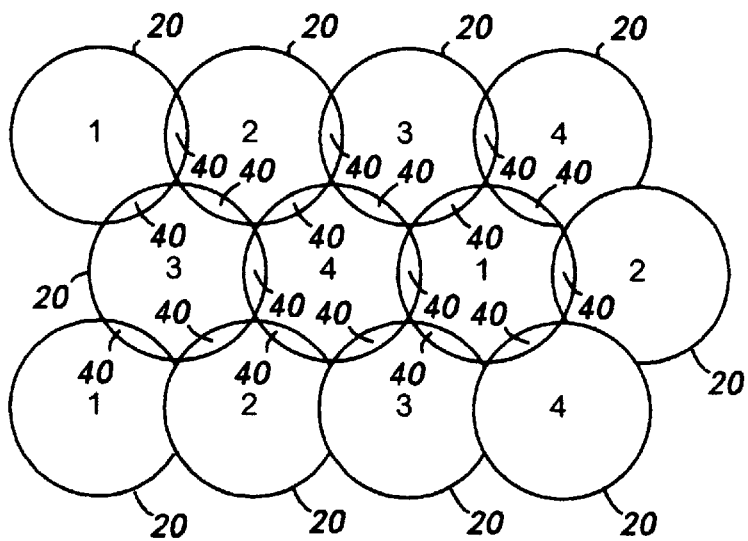

FIG. 8C is a diagram illustrating the set of coverage areas formed by the use of four separate base stations, each connected to their own set of repeaters, to form a data communications system. Each of the coverage areas 20 in FIG. 8C is identified by a number associated with its corresponding base station 12 (and the corresponding set of repeaters 18). For example, the coverage areas 20 identified by the number "1" are associated with a first base station; the coverage areas 20 marked by the number "2" are associated with a second base station; the coverage areas 20 marked by "3" are associated with a third base station; and the coverage areas 20 identified by the number "4" are associated with a fourth base station. By arranging the coverage areas in the cell pattern shown in FIG. 8C, four base stations can be used to further extend the coverage of a data communications system without the creation of substantial interference within the overlap areas 40 of the coverage areas 20 for these base stations.

Figure 8D:
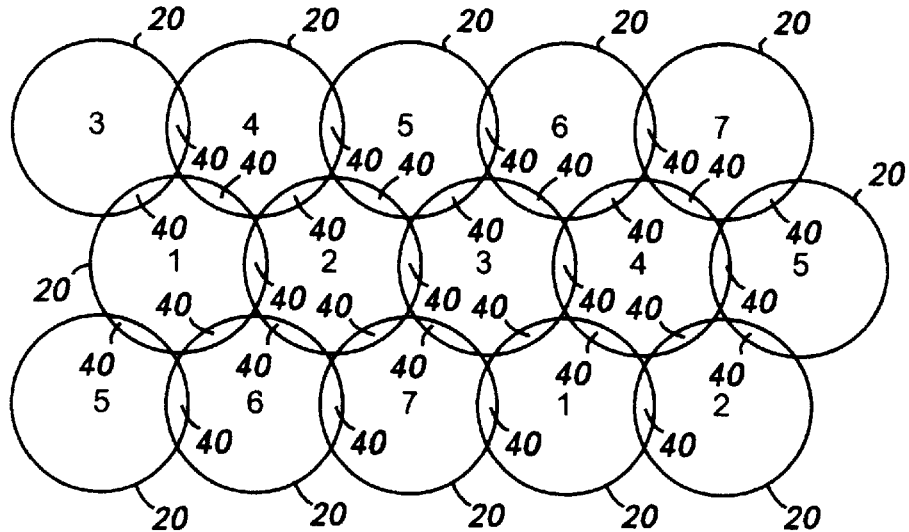

FIG. 8D is a diagram illustrating a pattern of coverage areas associated with the use of seven different base stations within a data communications system. The coverage areas identified by a particular number are associated with a corresponding base station. Consequently, the transmissions occurring within a set of the coverage areas 20 for a particular base station have the frequency hopping sequence for that base station. As described above with respect to FIGS. 8B and 8C, any pair of coverage areas for a particular base station are not located adjacent to each other to avoid the possibility of interference within the resulting overlap area 40. By arranging the coverage areas in the cell pattern shown in FIG. 8D, seven base stations can be used to further extend the coverage of a data communications system without the creation of substantial interference within the overlap areas 40 of the coverage areas for these base stations.

Figure 9:
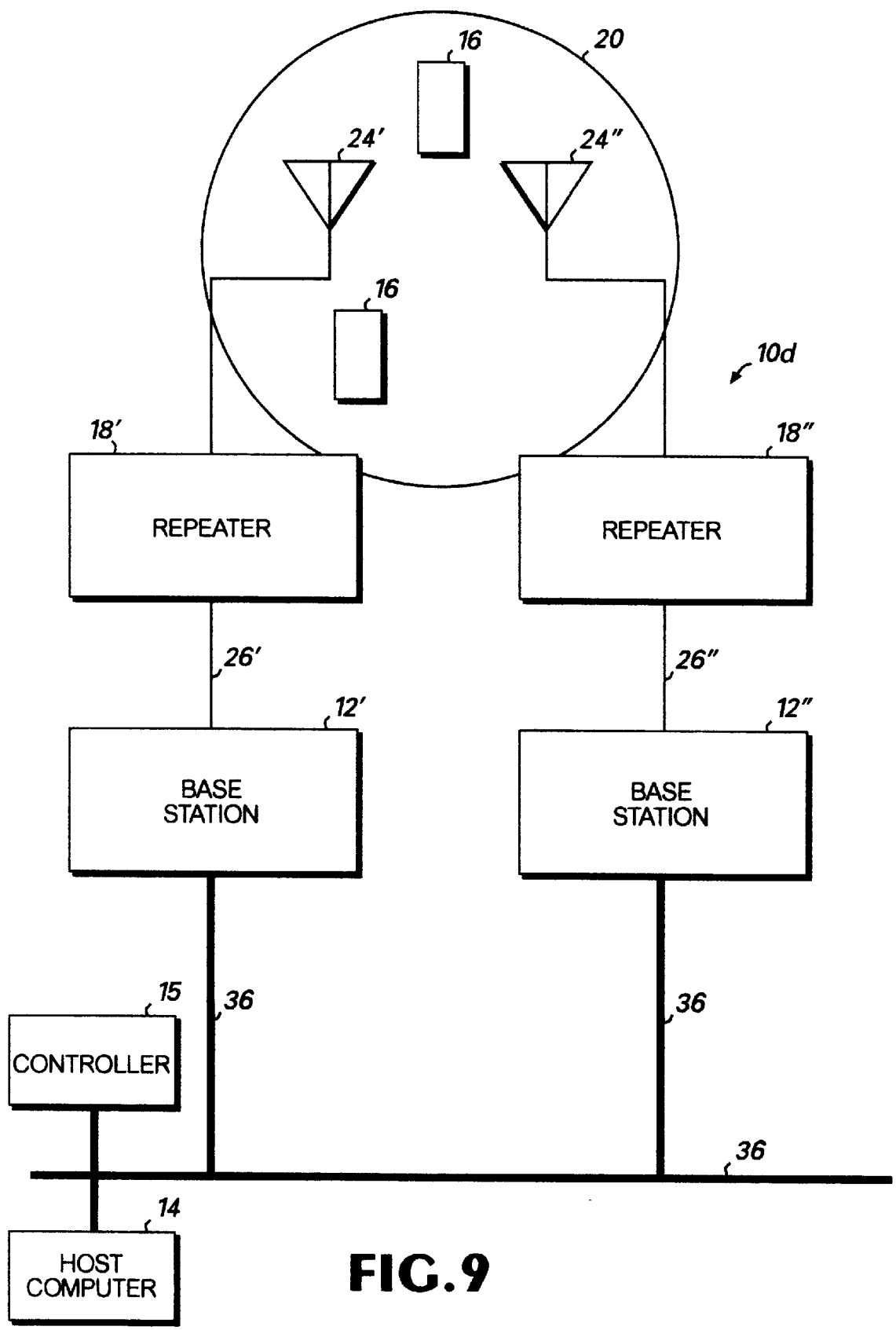
FIG. 9 is a block diagram illustrating a redundant communications feature of an embodiment of the data communications system provided by the present invention.

FIG. 9 is a block diagram illustrating the use of two separate and independent base stations to form a data communications system to supply the desirable feature of redundant communications. Turning now to FIG. 9, a data communications system 10d comprises a pair of base stations 12' and 12" and a pair of repeaters 18' and 18". The base stations 12' and 12" are connected to the controller 15 and to the host computer 14 via the communications link 36. The base station 12' is connected to the repeater 18' via the communications link 26'. Likewise, the base station 12" is connected to the repeater 18" via the communications link 26". Each of the repeaters 18' and 18" share the same coverage area, the coverage area 20. In this manner, the repeaters 18' and 18" effectively supply a redundant communications capability for the data communications system 10d. For example, in the event that the repeater 18' fails, the repeater 18" can still support communication activities with remote terminals 16 within the coverage area 20. To distinguish the signals distributed by the computer 18' from those of the repeater 18", the base station 12' preferably has a different frequency hopping sequence than the base station 12". In particular, the base stations 12' and 12" have orthogonal frequency hopping sequences.

It will be appreciated that the data throughput of the data communication system 10d is increased over a data communication system having only a single base station and an associated set of repeaters. By supplying redundant or duplicate coverage within the coverage area 20, the throughput of the data communication system is increased for that particular coverage area. In particular, by doubling the number of base stations and their corresponding repeaters, one can achieve an increased data throughput for the overall data communication system.

Figure 10A:
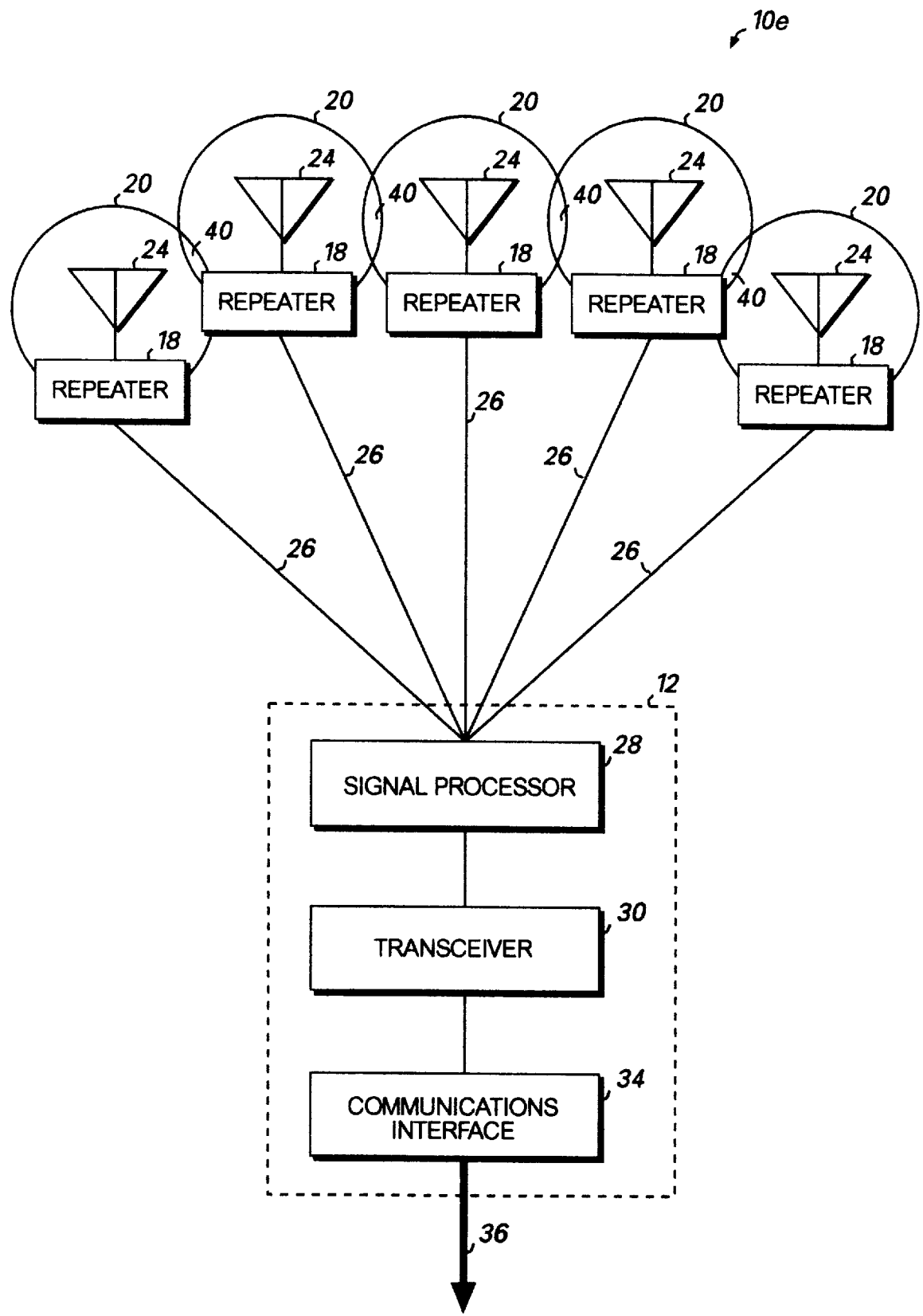
FIGS. 10A and 10B, collectively described as FIG. 10, are diagrams illustrating alternative distribution architectures for the data communications system of the present invention.
Figure 10B:
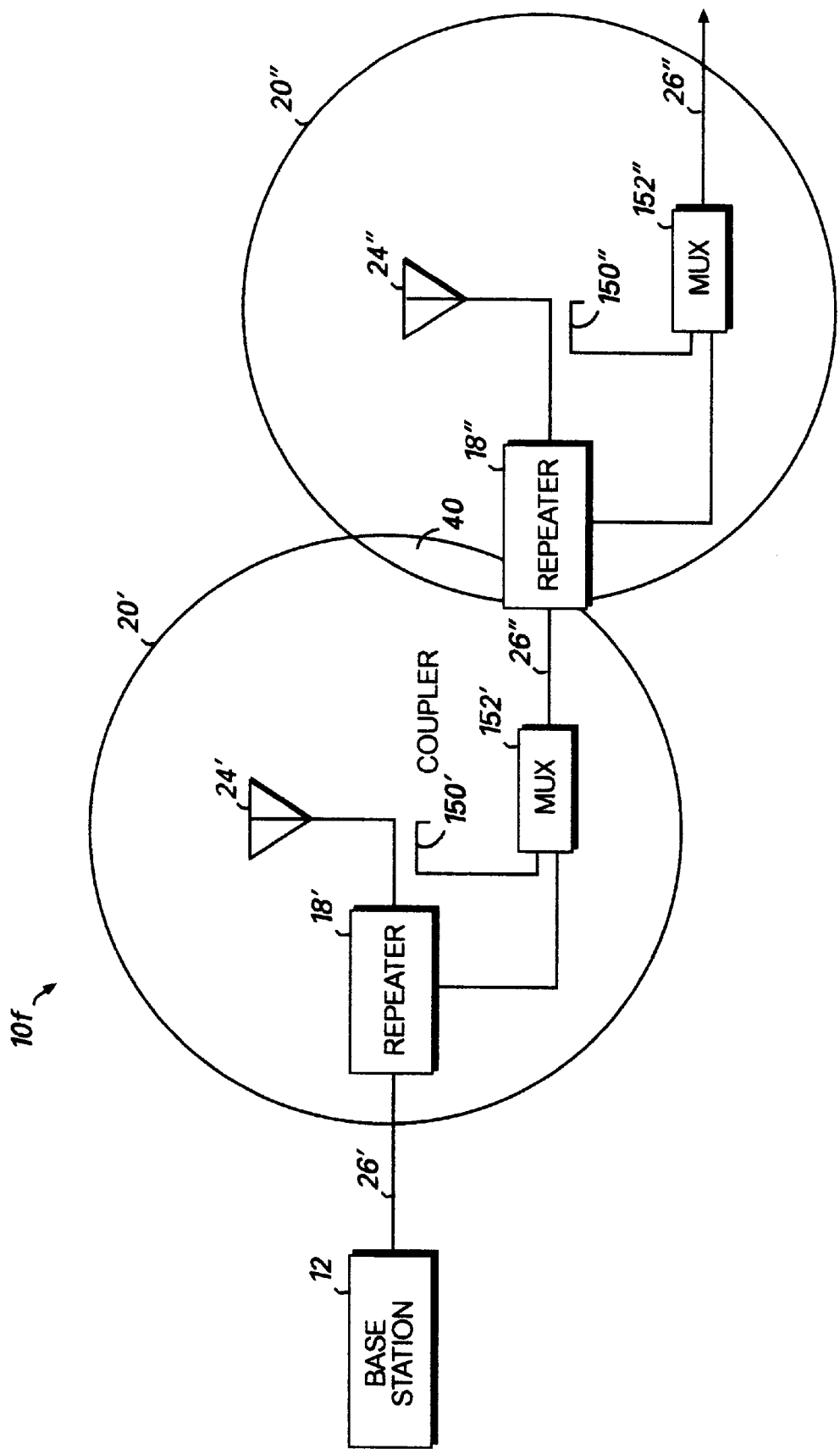

FIG. 10A is a block diagram illustrating a "star"-type arrangement for the connection of repeaters to a single base station for the data communications system of the present invention. FIG. 10B is a block diagram illustrating a serial-type arrangement for connecting repeaters to a single base station of the data communications system for the present invention. Referring first to FIG. 10A, the data communications system 10e comprises a base station 12, which includes a signal processor 28, a transceiver 30, and a communications interface 34, connected between a host computer 14 and a set of repeaters 18. Each repeater is connected to the signal processor 28 via a first communications link 26, whereas the host computer 14 is connected to the communications interface 34 via a second communications link 36. The central location of the base station 12 within this architecture for the data communications system 10 is responsible for the "star"-like appearance of this signal distribution system. Much like a central hub and spoke system for a major airline, all signals for distribution to and from repeaters 18 are routed through the signal processor 28 of the base station 12.

Significantly, the signal processor 28 serves as a central connection point for connecting the repeaters 18 to the base station 12. This results in the distribution of all incoming signals from the repeaters 18 to the transceivers 30 via the signal processor 28. Likewise, the outgoing signal output by the transceiver 30 is necessarily supplied to each of the repeaters 18 via a signal processor 28. Consequently, each outgoing signal output by the base station 12 is supplied to each of the repeater 18. In contrast, an incoming signal repeated by a particular repeater 18 is directly supplied to the base station 12 via the transmission path of the communications link 26.

It will be appreciated that the data communications system 10e can be extended beyond the five repeaters 18 shown in FIG. 10A. For example, another repeater can be added to the embodiment shown in FIG. 10B by connecting the repeater to the base station via another communications link. Each of the coverage areas 20 of the data communications system 10e will have the same frequency hopping sequence because all of the repeaters receive outgoing data from the same base station 12. Adjacent coverage areas 20 associated with a pair of the repeaters 18 form a slight overlap area 40 to support roaming by mobile remote terminals within these coverage areas.

Turning now to FIG. 10B, the centrally located signal processor 28 of FIG. 10A is replaced with a set of couplers, each associated with a repeater. Each coupler has a through signal path and a coupled signal path. A signal entering the through signal path of a coupler is permitted to exit with minimal signal loss or degradation. In contrast, the coupled signal path provides a coupled or sampled portion of the signal entering the coupler. Consequently, it will be appreciated that each coupler can supply a throughput signal via the through signal path and a coupled signal via the coupled signal path.

For the "series feed" architecture of the data communications system 10f shown in FIG. 10B, the base station 12 is connected to a first repeater 18' via a communications link 26'. The repeater 18' includes an antenna 24', a coupler 150', and a multiplexor 152'. The coupler 150', which is connected between the antenna 24' and the multiplexor 152', samples portions of RF signals for transmission via the antenna 24'. In addition, the coupler 150' accepts RF signals from the multiplexor 152' and forwards these signals to the repeater 18'. The multiplexor 152' is connected to the repeater 18', the coupled port of the coupler 150', and a communications link 26" linking the repeater 18' to a repeater 18". The multiplexor 152' accepts the power signal output by the base station 12 to the repeater 18' and, in turn, forwards the power signal to the repeater 18" via the first communications link 26". The multiplexor 152' also accepts coupled RF signals from the repeater 18' and, in response, forwards these samples to the repeater 18" via the communications link 26". In view of the bidirectional nature of the communications link 26", the multiplexor 152' also accepts the power signal and RF signals from the repeater 18" and, in response, forwards the power signal directly to the repeater 18' and the RF signals to the repeater 18' via the coupled port of the coupler 150'.

The repeater 18", which is connected to the repeater 18' via the communications link 26", comprises an antenna 24", a coupler 150", and a multiplexor 152". Similar to the repeater 18', the coupler 150" is connected between the antenna 24" and the multiplexor 152", and the multiplexor 152" is directly connected to the repeater 18", the coupled port of the coupler 150", and a communications link 26'" linking the repeater 18' to another repeater (not shown). It will be understood that the coupler 150" and the multiplexor 152" conduct operations in a manner similar to their counterpart components of the repeater 18', i.e., the coupler 150' and the multiplexor 152'. The adjacent coverage areas 20 for the respective repeaters 18' and 18" form a slight overlap area 40 to permit "roaming" by remoter terminals between these coverage areas.

Turning now to operation of the data communications system shown in FIG. 10B, the base station 12 distributes RF signals associated with incoming and outgoing data, as well as electrical power signals for supplying power to the repeaters and for controlling the operating state of the repeaters. The communications link 26' carries these signals between the base station 12 and the repeater 18'. In response, the repeater 18' amplifies the outgoing data and outputs amplified outgoing data for distribution within the coverage 20' via the antenna 24'. The coupler 150' couples a sample of amplified outgoing data generated by the repeater 18' for transmission within the coverage area 20'. This coupled sample of amplified outgoing data is supplied to the repeater 18" via the signal path formed by the multiplexor 152' and the communications link 26". In addition, the repeater 18' directs the power signal output by the base station 12 to the repeater 18" via the signal path formed by the multiplexor 152' and the communications link 26".

In response to the sample of the amplified outgoing data and the power signal, the multiplexor 152' outputs a combined signal for distribution via the communications link 26" to the repeater 18". In turn, the repeater 18" can generate a further amplified version of the amplified outgoing data originated by the repeater 18' and thereafter forward the twice-amplified outgoing data to the remote terminals within the coverage area 20". The twice-amplified outgoing data is distributed within the coverage 20" via the antenna 24". Similar to the repeater 18', the repeater 18" also can forward the twice-amplified outgoing data to another repeater via the signal path formed by the combination of the coupler 150", the multiplexor 152", and the communications link 26'". Likewise, the repeater 18" can forward the power signal to another repeater via the signal path formed by the multiplexor 152" and the communications link 26'".

For incoming data received by the repeater 18" within the coverage area 20", the repeater 18" amplifies the received RF signal and outputs amplified incoming data to the repeater 18' via the signal path formed by the combination of the communications link 26", the multiplexor 152', and the coupler 150'. In turn, the repeater 18' further amplifies the amplified incoming data and thereafter outputs the twice-amplified incoming data to the base station 12 via the communications link 26'.

In view of the foregoing, it will be appreciated that the series-feed architecture of the data communications system 10f can be extended beyond the pair of repeaters 18' and 18" shown in FIG. 10B. For example, as suggested above, another repeater can be added to the embodiment shown in FIG. 10B by connecting the repeater to the communications link 26'". Regardless of the number of repeaters used by the series-feed architecture, each of the coverage areas 20 of the data communications system 10f will have the same frequency hopping sequence because all of the repeaters receive outgoing data from the same base station 12.

Figure 11:
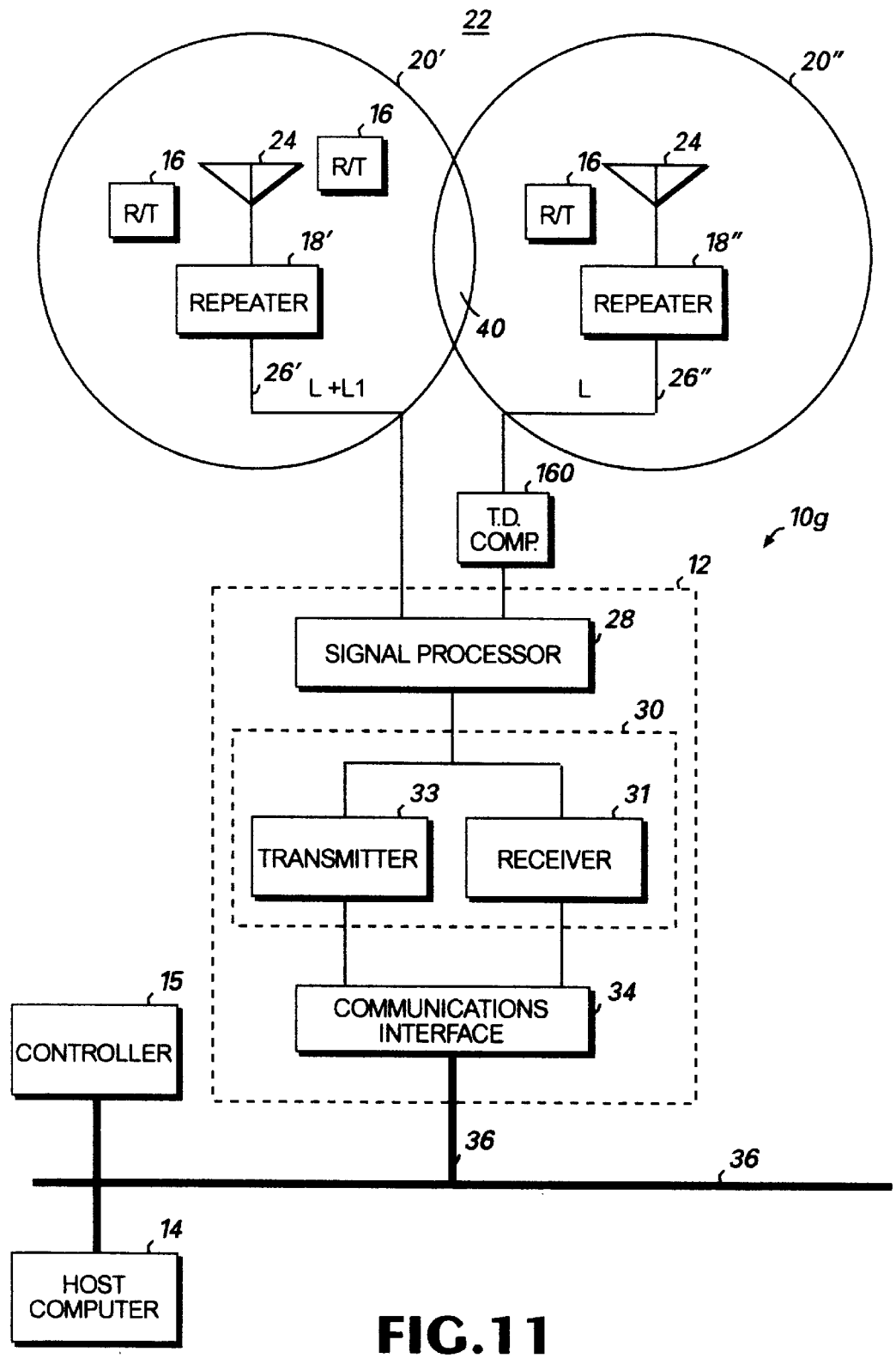
FIG. 11 is a block diagram illustrating a time delay compensation module within the data communications system of the present invention.

FIG. 11 is a block diagram illustrating a compensation technique for balancing the signal path differential between a pair of communications links extending between a two repeaters and a base station. As described above, the first communications link is commonly implemented as a physical bidirectional transmission medium, such as coaxial cable. Because a signal carried by a coaxial cable can be affected by the cable's characteristics, it will be appreciated that the physical length of the cable can affect the electrical characteristics of the carried signal, thereby causing changes in phase and amplitude. Consequently, the physical implementation of a data communications system can be somewhat complicated by varying physical lengths of the communications links connecting the repeaters with the base station.

For example, a remote terminal, operating in an overlap area between adjacent coverage areas, can generate an incoming data signal that will be received by the repeaters within both coverage areas. Both repeaters will forward the incoming data signal to the base station via corresponding communications links. In the event that these communications links have different lengths, the resultant signals output by these links to the base station may have slightly different electrical characteristics, i.e., different delay characteristics. This difference between the pair of incoming data signals may lead to intersymbol interference during signal reception operations at the base station. Because the physical environment of the communications system may dictate a variety of lengths for the communications links, a time delay compensation mechanism can be used by the data communications system to balance the path differential between any two links.

In FIG. 11, the data communications system 10g includes a single base station 12 connected to a first repeater 18' via a communications link 26', and to a second repeater 18' via a communications link 26". The communications link 28' has a cable length of $L+L_1$, whereas the communications link 26" has a cable length of L. The coverage areas 20 of the repeaters 18' and 18" overlap to form an overlap area 40. Because the repeaters 18' and 18" are connected to the same base station 12, the transmissions occurring within the respective coverage areas 20 for these repeaters will have the same frequency hopping sequence. An overlap area 40 is the result of the slight overlap between the adjacent coverage areas 20.

For an incoming signal generated by a remote terminal within the overlap area 40, the repeaters 18' and 18" will each receive the signal and, in response, output amplified versions of the incoming signal. If the difference in cable lengths between the communications links 26' and 26" is not balanced, the base station 12 will receive an amplified incoming signal from the repeater 18' that will have slightly different electrical characteristics from the amplified incoming signal forwarded by the repeater 18". This timing difference between the incoming signals at the receiver 31, which leads to intersymbol interference, is a direct result of the path differential that exists between the communications links 28' and 28". This undesirable phenomenon can be minimized by the use of a time delay compensation module 160 within the communications link 26" that balances the path differential between the communications links 26' and 26".

One well known analog technique for time delay compensation is the addition of a predetermined length of coaxial cable for the particular communications link having the shorter length. For the example in FIG. 11, an additional cable length of "$L_1$" can be added to the communications link 26" at the time delay compensation module 160 to achieve an overall cable length identical to the communications length 28'. In this manner, the time for forwarding an incoming signal from the repeater 18' to the base station 12 is identical to the delay associated forwarding the incoming signal from the repeater 18". A switching device can be used to control the insertion of the extra cable length within the communications link 26".

An alternative compensation technique can be implemented by the insertion of a phase shifter within each communication link at the base station. The operation of a phase shifter permits the adjustment of the phase of incoming signals forwarded by the repeaters to the base station. For example, a single-bit 90 degree phase shifter can be installed between the signal processor 28 and each of the communications links 26' and 26" to control the phase of incoming signals carried by these lengths. The phase setting of each phase shifter can be changed as required on a frequency hop basis for each of the frequency carriers of the frequency hop sequence. By controlling the phase of the incoming signals, the receiver 31 can detect the strongest possible version of the combined signal resulting from the combination of these signals. In particular, by aligning the phases of the incoming signals, the receiver 31 will receive a resultant signal that is much stronger in signal strength than a resultant signal created in the absence of phase control operations. Thus, the phase control operations for this alternative compensation technique lead to a balancing of path differentials and the optimized combination of incoming signals at the receiver of the base station.

Although the data communications system of the present invention encompasses the concept of communicating with mobile remote terminals operating within adjacent coverage areas, it will be appreciated that the present invention is different from a conventional cellular radiotelephone system. In contrast to a cellular radiotelephone system, the data communications system is a reciprocal system that uses the same signal path for distributing signals between a base station and a repeater. Moreover, the data communications system of the present invention is preferably a frequency diverse system employing a spread spectrum communications technique, whereas a cellular radiotelephone system is a narrowband system. Also, the data communications system of the present invention is a half-duplex communications system, whereas a cellular radiotelephone system operates as an apparent full-duplex communications system.

In summary, the present invention provides a novel and economical solution to the problem of extending the communications coverage of a data communications system by adding a set of repeaters for use with a base station. Significantly, the use of a set of repeaters with a single base station to obtain increased communications coverage is desirable because there is no need for a remote terminal to transition between different frequency hopping sequences as the remote terminal roams within the communication environment. In other words, the present invention provides extended communications coverage without requiring the use of roaming control signals to "hand-off" a roaming remote terminal from cell to another cell of the data communications system. Although the present invention has been described with respect to a particular application, namely the Business Radio System application, it will be appreciated that the present invention can be extended to any frequency range, including Instrumentation, Scientific, and Medical (ISM) bands, Personal Communication System (PCS) bands, and so forth. In addition, the present invention can be adapted for use with conventional spread spectrum communications techniques, including the FHSS and DSSS techniques. Also, the present invention can be used to support communications within a building or an outdoor environment.

It should be understood that the particular embodiments described herein have been disclosed by way of example and that other modifications may occur to those skilled in the art without departing from the scope and spirit of the appended claims.

We claim:

1. In a communications system characterized by a plurality of remote terminals within a predetermined area, a host computer for controlling the communications system, and an improved access point for communicating with the remote terminals in response to outgoing data from the host computer and for communicating with the host computer in response to incoming data from the remote terminals, the improved access point comprising:

a plurality of repeaters, each repeater having one of a plurality of coverage areas in the predetermined area to communicate with the remote terminals located within its coverage area, each repeater including an antenna system and operative to amplify the incoming data received via the antenna system to output amplified incoming data;

a base station, connected to each of the repeaters via a first wired communications link and to the host computer via a second communications link, for receiving the amplified incoming data from the repeaters via the first wired communications link and, in response, outputting processed incoming data to the host computer via the second communications link, the base station further operative for accepting the outgoing data from the host computer via the second communications link and, in response, sending transmitted outgoing data to each repeater via the first wired communications link, each repeater further operative to amplify the transmitted outgoing data to output amplified outgoing data via the antenna system to the remote terminals within its coverage area each repeater comprising:

an up-converter, connected to the first wired communications link, for converting the IF signal of the outgoing data to the RF signal of the outgoing data;

a transmit amplifier, connected between the up-converter and the antenna system, for amplifying the RF signal of the outgoing data to generate amplified outgoing data for transmission via the antenna system to the remote terminals within the coverage area of the repeater;

a receive amplifier, connected to the antenna system, for amplifying the RF signal of the incoming data supplied via the antenna system to generate amplified incoming data; and a down-converter, connected between the first wired communications link and the receive amplifier, for converting the amplified incoming data to the IF signal of the incoming data.

2. The improved access point of claim 1, wherein the base station comprises:

a transceiver, connected to each of the repeaters via a first wired communications link, for receiving the amplified incoming data from the repeaters via the first wired communications link and, in response, outputting detected incoming data; and a communications interface, connected to the host computer via the second communications link and to the transceiver, for processing the detected incoming data from the transceiver to generate processed incoming data and for processing the outgoing data from the host computer to generate processed outgoing data, the communications interface further operative to forward the processed incoming data to the host computer via the second communications link and to forward the processed outgoing data to the transceiver, the transceiver further operative to send transmitted outgoing data to each repeater via the first wired communications link in response to the processed outgoing data.

3. The improved access point of claim 2, wherein the transceiver comprises:

a receiver for receiving the IF signal of the incoming data and, in response, generating the detected incoming data;

a transmitter for transmitting the IF signal of the outgoing data in response to the processed outgoing data supplied by the communications interface; and a signal processor, connected between the transmitter and the receiver and to each first wired communications link, for distributing the IF signal of the outgoing data to each of the repeaters via a corresponding first wired communications link, and for supplying the IF signal of the incoming data from each of the repeaters to the receiver.

4. In a spread spectrum communications system characterized by a plurality of remote terminals within a predetermined area, a host computer for controlling the communications system, and an improved access point for communicating with the remote terminals in response to outgoing data from the host computer and for communicating with the host computer in response to incoming data from the remote terminals, the improved access point comprising:

a plurality of repeaters, each repeater having one of a plurality of coverage areas in the predetermined area to communicate with the remote terminals located within its coverage area, each repeater including an antenna system and operative to amplify the incoming data received via the antenna system to output amplified incoming data; and a base station, comprising:

a radio transceiver, operating in a spread spectrum communications mode and connected to each of the repeaters via a first wired communications link, for receiving the amplified incoming data from the repeaters via the first wired communications link and, in response, outputting detected incoming data; and a communications interface, located outside of the predetermined area and connected to the host computer via a second communications link and to the transceiver, for processing the detected incoming data from the transceiver to generate processed incoming data and for processing the outgoing data from the host computer to generate processed outgoing data, the communications interface further operative to forward the processed incoming data to the host computer via the second communications link and to forward the processed outgoing data to the transceiver, wherein the transceiver is further operative to send transmitted outgoing data to each repeater via the first wired communications link in response to the processed outgoing data, and each repeater is further operative to amplify the transmitted outgoing data to output amplified outgoing data via the antenna system to the remote terminals within its coverage area.

5. The improved access point of claim 4, wherein each repeater comprises:

a transmit amplifier for amplifying the transmitted outgoing data to produce the amplified outgoing data for transmission via the antenna system to the remote terminals within the coverage area of the repeater;

a receive amplifier for amplifying the incoming data received via the antenna system to produce amplified incoming data for delivery to the transceiver via the first wired communications link; and a switch, connected to the first wired communications link, for selectively coupling one of the transmit amplifier and the receive amplifier to the first wired communications link.

6. The improved access point of claim 5, wherein:

the switch operates in a first operating state to pass the amplified outgoing data from the first wired communications link to the transmit amplifier and in a second operating state to pass the amplified incoming data from the receive amplifier to the first wired communications link, and the communications interface, coupled to the switch via a control link, is operative to control whether the switch is operating in the first operating state or the second operating state by sending a state signal to the switch via the control link.

7. The improved access point of claim 6, wherein the control link comprises the first wired communications link connecting each repeater to the transceiver.

8. The improved access point of claim 5, wherein the antenna system comprises:

an antenna; and a circulator connected between the antenna and both the transmit amplifier and the receive amplifier, for passing the amplified outgoing data to the antenna system from the transmit amplifier and for passing the incoming data from the antenna system to the receive amplifier.

9. The improved access point of claim 4, wherein each repeater comprises:

a transmit amplifier for amplifying the transmitted outgoing data to produce the amplified outgoing data for transmission via the antenna system;

a receive amplifier for amplifying the incoming data received via the antenna system to produce amplified incoming data for delivery to the transceiver via the first wired communications link;

a first switch, connected to the first wired communications link, for selectively coupling one of the transmit amplifier and the receive amplifier to the first wired communications link; and a second switch, connected to the antenna system, for selectively coupling one of the transmit amplifier and the receive amplifier to the antenna system.

10. The improved access point of claim 4, wherein each repeater comprises:

a transmit amplifier for amplifying the transmitted outgoing data to produce the amplified outgoing data for transmission via the antenna system;

a receive amplifier for amplifying incoming data received via the antenna system to produce the amplified incoming data for delivery to the transceiver via the first wired communications link; and a circulator, connected to the first wired communications link, for passing the transmitted outgoing data from the first wired communications link to the transmit amplifier and for passing the amplified incoming data from the receive amplifier to the first wired communications link, the antenna system comprising a transmit antenna connected to the transmit amplifier and a receive antenna connected to the receive amplifier.

11. The improved access point of claim 4, wherein each repeater comprises:

a transmit amplifier for amplifying the transmitted outgoing data to produce the amplified outgoing data for transmission via the antenna system;

a receive amplifier for amplifying incoming data received via the antenna system to produce the amplified incoming data for delivery to the transceiver via the first wired communications link;

a first circulator, connected to the first wired communications link and to the transmit amplifier and the receive amplifier, for passing the transmitted outgoing data to the transmit amplifier from the first wired communications link and for passing the amplified incoming data from the receive amplifier to the first wired communications link; and a second circulator, connected to the antenna system and to the transmit amplifier and the receive amplifier, for passing the incoming data from the antenna system to the receive amplifier and for passing the amplified outgoing data from the transmit amplifier to the antenna system.

12. The improved access point of claim 4, wherein the transceiver comprises:

a radio transmitter for responding to the processed outgoing data by transmitting the transmitted outgoing data;

a radio receiver for generating the detected incoming data in response to receiving the amplified incoming data; and a signal processor for connecting the radio transmitter and the radio receiver to each repeater via a corresponding first wired communications link.

13. The improved access point of claim 4, wherein each repeater comprises:

a transmit amplifier for amplifying a radio frequency (RF) signal of the transmitted outgoing data to produce the amplified outgoing data for transmission via the antenna system; and a receive amplifier for amplifying an RF signal of the incoming data received via the antenna system to produce the amplified incoming data;

a first signal converter, connected between the transmit amplifier and the first wired communications link, for converting an intermediate frequency (IF) signal of the transmitted outgoing data to the RF signal of the transmitted outgoing data; and a second signal converter, connected between the receive amplifier and the first wired communications link, for converting the RF signal of the amplified incoming data to an IF signal of the amplified incoming data.

14. The improved access point of claim 13, wherein the transceiver comprises:

a transmitter for sending the RF signal of the transmitted outgoing data in response to the processed outgoing data;

a third signal converter, connected to the transmitter, for converting the RF signal of the transmitted outgoing data to the IF signal of the transmitted outgoing data;

a receiver for generating the detected incoming data in response to receiving the RF signal of the amplified incoming data; and a fourth signal converter, connected to the receiver, for converting the IF signal of the amplified incoming data to the RF signal of the amplified incoming data; and a signal processor for connecting each repeater to the transceiver via a corresponding first wired communications link, the signal processor connected between the third signal converter and the fourth signal converter and each first wired communications link.

15. The improved access point of claim 4, wherein the first wired communications link is a wired bidirectional communications link selected from one of a group of coaxial cable and optical fiber cable.

16. The improved access point of claim 4, wherein the second communications link is a local area network.

17. The improved access point of claim 4, wherein the transceiver and each of the remote terminals operate in a spread spectrum mode to support communication of the incoming data and the outgoing data between the remote terminals and the host computer.

18. The improved access point of claim 4, wherein the transceiver and each of the remote terminals operate in a frequency hopping spread spectrum mode (FHSS), the FHSS mode defined by a predetermined plurality of carrier frequencies, a predetermined hop sequence, and a predetermined hop period.

19. The improved access point of claim 4, wherein the transceiver and each of the remote terminals operate in a direct sequence spread spectrum mode (DSSS), the DSSS mode defined by a predetermined carrier frequency and a pseudo random bit sequence.

20. The improved access point of claim 4 further comprising a phase shifter connected between each first wired communications link and the transceiver, the phase shifter operative to adjust a phase portion of the amplified outgoing data and to adjust a phase portion of the amplified incoming data received by the transceiver to compensate for time delays among the various lengths of the first wired communications links.

21. The improved access point of claim 4, wherein the transceiver sends the transmitted outgoing data to a particular one of the repeaters over a same first wired communications link used by the particular repeater to output the amplified incoming data to the transceiver, thereby forming a half-duplex communications operation between the transceiver and the particular repeater.

22. The improved access point of claim 4, wherein each repeater receives electrical power via its first wired communication link, the electrical power distributed by the transceiver for powering each repeater.

* * * * *